US012598510B2

(12) United States Patent (10) Patent No.: US 12,598,510 B2
Huang (45) Date of Patent: Apr. 7, 2026

(54) METHOD AND DEVICES FOR LINK ADAPTATION FEEDBACK IN WIRELESS LOCAL AREA NETWORKS

(71) Applicant: GUANGDONG OPPO MOBILE TELECOMMUNICATIONS CORP., LTD., Dongguan (CN)

(72) Inventor: Lei Huang, Singapore (SG)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 310 days.

(21) Appl. No.: 18/366,375

(22) Filed: Aug. 7, 2023

(65) Prior Publication Data

US 2023/0379760 A1 Nov. 23, 2023

Related U.S. Application Data

(63) Continuation of application No. PCT/CN2022/075814, filed on Feb. 10, 2022.

(30) Foreign Application Priority Data

Feb. 10, 2021 (SG) ............................ 10202101420T
Mar. 16, 2021 (SG) ............................ 10202102677U

(51) Int. Cl.
H04W 28/06 (2009.01)
H04W 84/12 (2009.01)

(52) U.S. Cl.
CPC ............ *H04W 28/06* (2013.01); *H04W 84/12* (2013.01)

(58) Field of Classification Search
CPC ... H04W 28/06; H04W 84/12; H04W 74/002; H04W 74/06; H04L 1/0026; H04L 1/0027; H04L 1/1621
See application file for complete search history.

(56) References Cited

U.S. PATENT DOCUMENTS

2006/0268886 A1* 11/2006 Sammour ............. H04W 28/18
370/394
2013/0188630 A1* 7/2013 Song ..................... H04L 1/1685
370/338

(Continued)

FOREIGN PATENT DOCUMENTS

CN 107613526 1/2018
CN 111542087 8/2020

(Continued)

OTHER PUBLICATIONS

IEEE P802.11ax/D8.0 (Year: 2020).*
EPO, Extended European Search Report for EP Application No. 22752324.8, Jul. 12, 2024.

(Continued)

*Primary Examiner* — Ricky Q Ngo
*Assistant Examiner* — David M Kayal
(74) *Attorney, Agent, or Firm* — Hodgson Russ LLP

(57) ABSTRACT

Embodiments of the invention provide methods and devices for link adaptation feedback in a wireless local area network (WLAN). The method for link adaptation feedback in a WLAN comprises: transmitting a first PPDU to one or more receiving devices, wherein the first PPDU comprises one or more A-MPDUs, and each A-MPDU corresponds to one of the one or more receiving devices, and receiving a second PPDU from each of the one or more receiving devices, wherein the second PPDU comprises a BA frame carrying a link adaptation feedback, wherein whether the link adaptation feedback is a solicited or an unsolicited link adaptation feedback depends on whether a link adaptation feedback request is included in the corresponding A-MPDU.

13 Claims, 10 Drawing Sheets

(56) References Cited

U.S. PATENT DOCUMENTS

| 2013/0294397 A1* | 11/2013 | Lee | H04L 1/0027 |
| | | | 370/329 |
| 2018/0123727 A1* | 5/2018 | Yu | H04W 24/10 |
| 2019/0268098 A1* | 8/2019 | Chun | H04L 1/0025 |
| 2021/0006360 A1 | 1/2021 | Asterjadhi et al. | |
| 2025/0030504 A1* | 1/2025 | Chun | H04L 1/0025 |

FOREIGN PATENT DOCUMENTS

| EP | 3306975 | 4/2018 |
| WO | 2012047067 | 4/2012 |
| WO | 2012070872 | 5/2012 |
| WO | 2012087054 | 6/2012 |

OTHER PUBLICATIONS

"Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 1: Enhancements for High Efficiency WLAN," IEEE P802.11ax™/D8.0, Oct. 2020.

Apple Inc., "Yet Another Fast Link Adaptation Attempt," IEEE 802.11-20/1005r1, Mar. 15, 2020.

Samsung, "Feedback Enhancement," IEEE 802.11-20/0047r1, Jan. 15, 2020.

Huawei, "Specification framework for TGbe," 19/1262r23; IEEE P802.11 Wireless LANs, Jan. 17, 2021.

WIPO, International Search Report and Written Opinion for PCT/CN2022/075814, May 7, 2022.

* cited by examiner

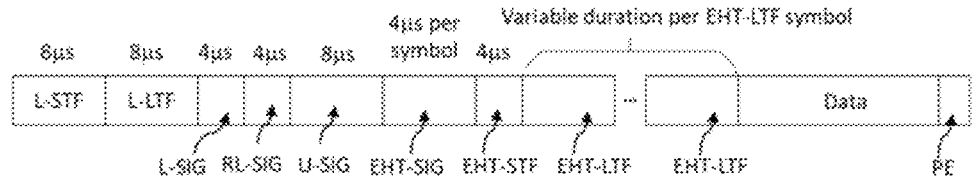

Figure 1A

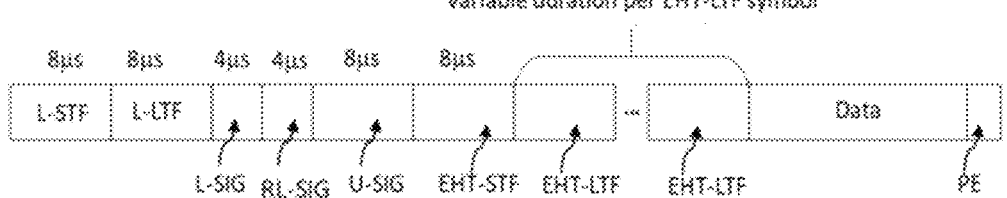

Transmit a first PPDU to STA2, wherein the first PPDU includes an A-MPDU corresponding to STA2.

202A

Receive a second PPDU from STA2, wherein the second PPDU includes a BA frame carrying a link adaptation feedback, wherein whether the link adaptation feedback is a solicited or an unsolicited link adaptation feedback depends on whether a link adaptation feedback request is included in the A-MPDU.

Figure 2A

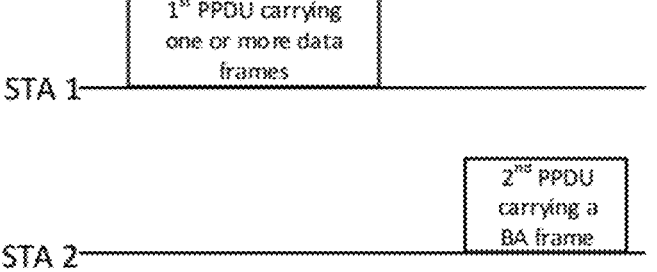

Figure 2B

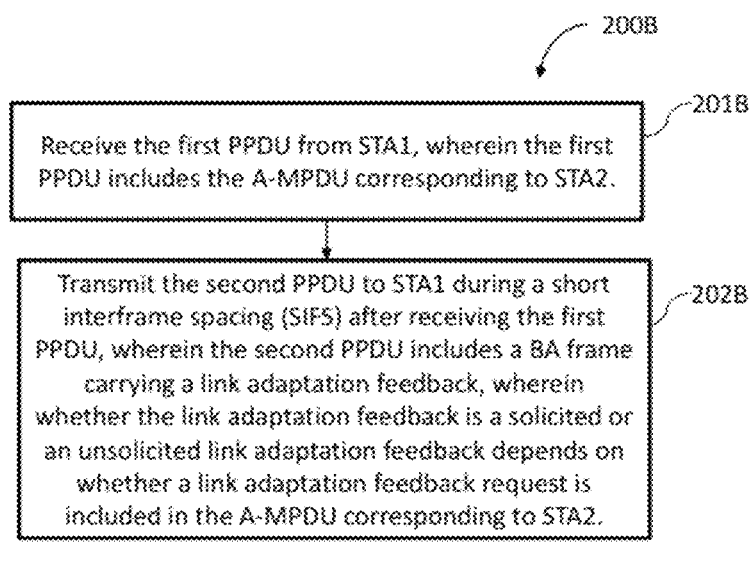

200B

2018

Receive the first PPDU from STA1, wherein the first PPDU includes the A-MPDU corresponding to STA2.

202B

Transmit the second PPDU to STA1 during a short interframe spacing (SIFS) after receiving the first PPDU, wherein the second PPDU includes a BA frame carrying a link adaptation feedback, wherein whether the link adaptation feedback is a solicited or an unsolicited link adaptation feedback depends on whether a link adaptation feedback request is included in the A-MPDU corresponding to STA2.

Figure 2C

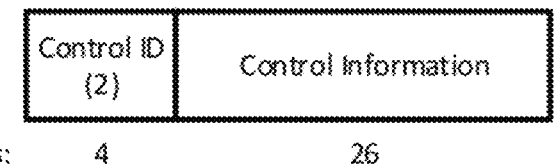

| Control ID (2) | Control Information |
|---|---|

Bits:      4              26

Figure 3A

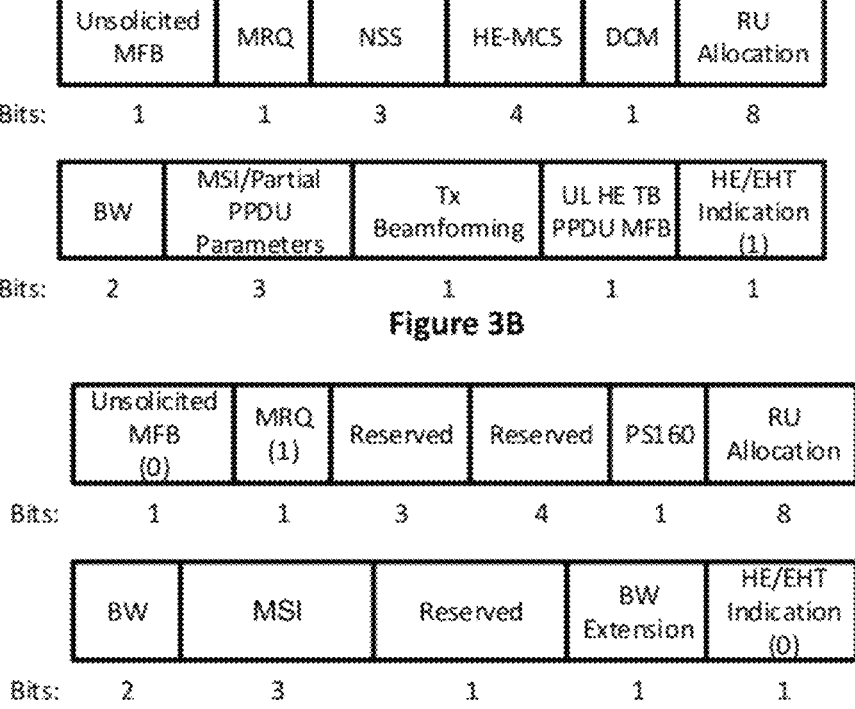

| Unsolicited MFB | MRQ | NSS | HE-MCS | DCM | RU Allocation |
|---|---|---|---|---|---|

Bits:    1      1      3      4      1      8

| BW | MSI/Partial PPDU Parameters | Tx Beamforming | UL HE TB PPDU MFB | HE/EHT Indication (1) |
|---|---|---|---|---|

Bits:    2      3      1      1      1

Figure 3B

| Unsolicited MFB (0) | MRQ (1) | Reserved | Reserved | PS160 | RU Allocation |
|---|---|---|---|---|---|

Bits:    1      1      3      4      1      8

| BW | MSI | Reserved | BW Extension | HE/EHT Indication (0) |
|---|---|---|---|---|

Bits:    2      3      1      1      1

Figure 3C

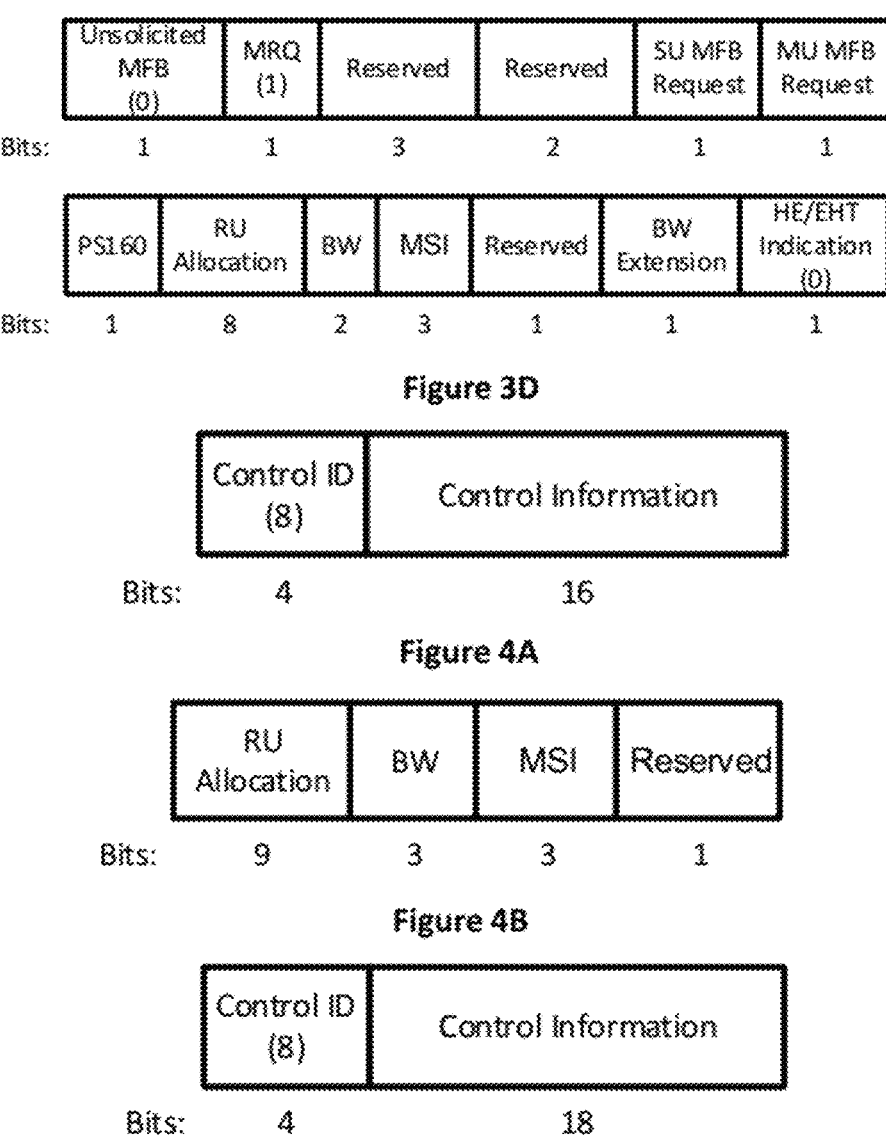
| Unsolicited MFB (0) | MRQ (1) | Reserved | Reserved | SU MFB Request | MU MFB Request |
|---|---|---|---|---|---|
| Bits: 1 | 1 | 3 | 2 | 1 | 1 |
| PS160 | RU Allocation | BW | MSI | Reserved | BW Extension | HE/EHT Indication (0) |
|---|---|---|---|---|---|---|
| Bits: 1 | 8 | 2 | 3 | 1 | 1 | 1 |
Figure 3D
| Control ID (8) | Control Information |
|---|---|
| Bits: 4 | 16 |
Figure 4A
| RU Allocation | BW | MSI | Reserved |
|---|---|---|---|
| Bits: 9 | 3 | 3 | 1 |
Figure 4B
| Control ID (8) | Control Information |
|---|---|
| Bits: 4 | 18 |
Figure 4C
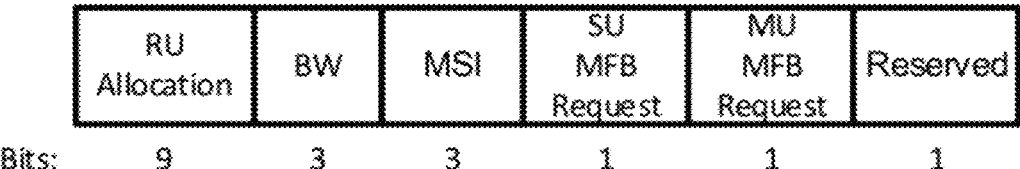
| RU Allocation | BW | MSI | SU MFB Request | MU MFB Request | Reserved |
|---|---|---|---|---|---|
| Bits: 9 | 3 | 3 | 1 | 1 | 1 |
Figure 4D

| Frame Control | Duration | RA | TA | BA Control | BA Information | FCS |
|---|---|---|---|---|---|---|

Bits:    2      2      6      6      2      Variable      4

| Reserved | BA Type (11) | MFB Present | Reserved | Reserved |
|---|---|---|---|---|

Bits:    1      4      1      6      4

Repeat for each
<AID, TID> tuple

| Per AID TID Info | MFB |
|---|---|

Octets:    variable      4 or 5

| MFB Control | PPDU Parameters | Recommended Parameters |
|---|---|---|

Octets:    1      0 or 1      3

| Unsolicited MFB | MSI | UL EHT TB PPDU MFB | Reserved |
|---|---|---|---|

Bits:    1      3      1      3

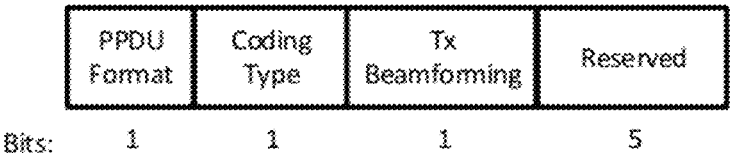
Figure 6E
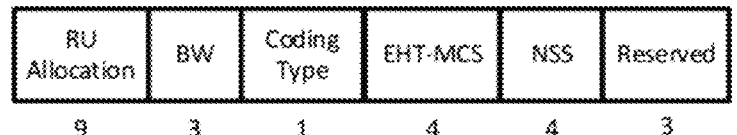
Figure 6F
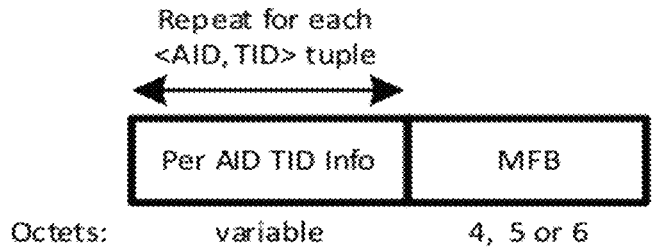
Figure 6G
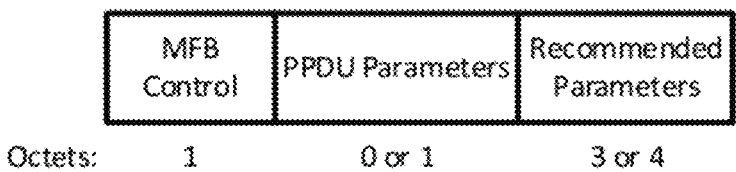
Figure 6H
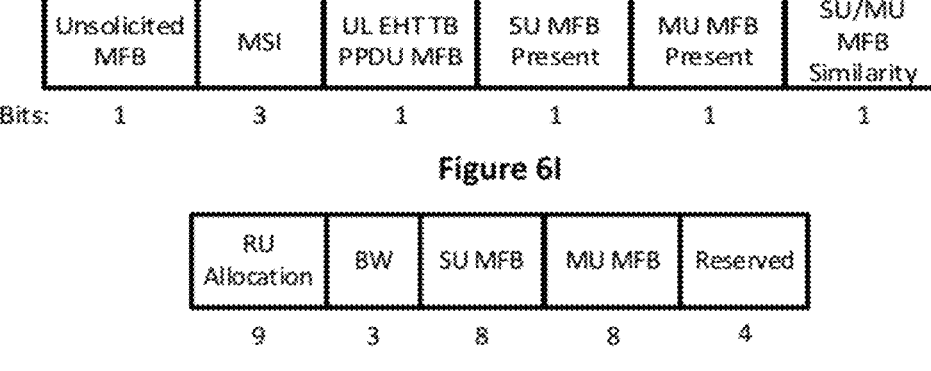
Figure 6I
Figure 6J

| Coding Type | EHT-MCS | NSS | Reserved |
|---|---|---|---|
| 1 | 4 | 4 | 7 |

Figure 6K

| Reserved | BA Type (2) | MFB Present | Reserved | TID Info |
|---|---|---|---|---|
| Bits: 1 | 4 | 1 | 6 | 4 |

Figure 7A

| Block Ack Starting Sequence Control | Block Ack Bitmap | MFB |
|---|---|---|
| Octets: 2 | 8, 32, 64 or 128 | |

Figure 7B

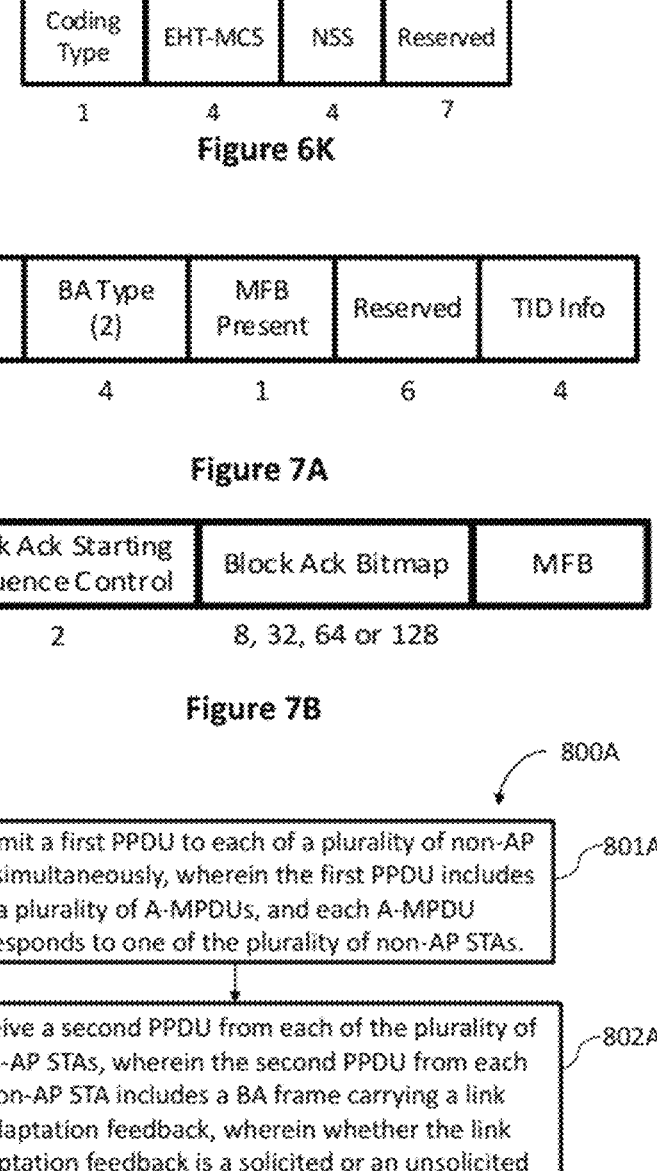

800A

Transmit a first PPDU to each of a plurality of non-AP STAs simultaneously, wherein the first PPDU includes a plurality of A-MPDUs, and each A-MPDU corresponds to one of the plurality of non-AP STAs. — 801A Receive a second PPDU from each of the plurality of non-AP STAs, wherein the second PPDU from each non-AP STA includes a BA frame carrying a link adaptation feedback, wherein whether the link adaptation feedback is a solicited or an unsolicited link adaptation feedback depends on whether a link adaptation feedback request is included in the corresponding A-MPDU. — 802A

Figure 8A

STA1

STA2

STA3

Repeat for each
<AID, TID> tuple
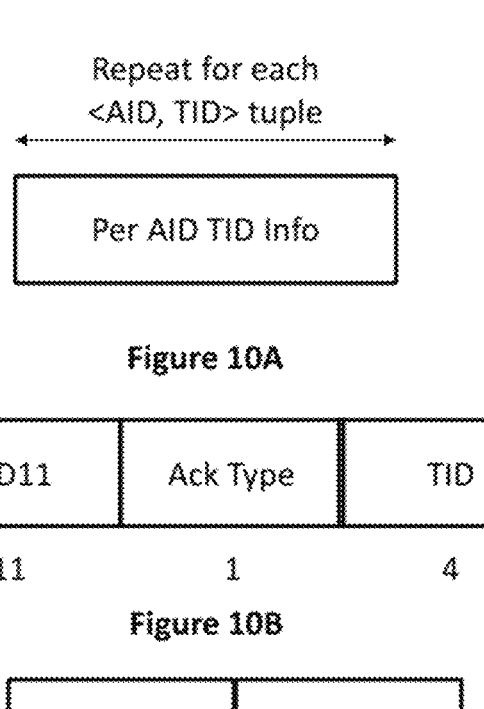
Figure 10A
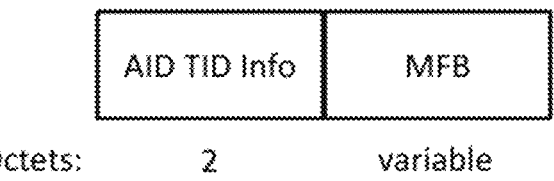
Figure 10B
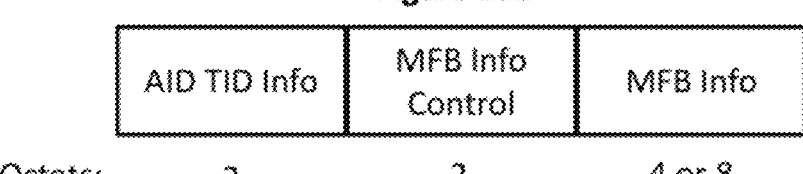
Figure 10C
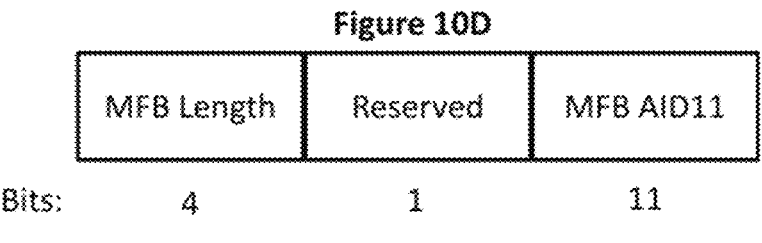
Figure 10D
Figure 10E
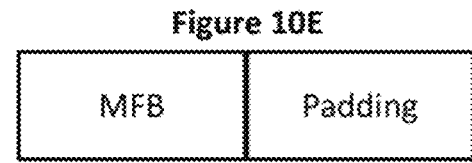
Figure 10F

METHOD AND DEVICES FOR LINK ADAPTATION FEEDBACK IN WIRELESS LOCAL AREA NETWORKS

CROSS REFERENCE TO RELATED APPLICATION(S)

This application is a continuation of International Application No. PCT/CN2022/075814, filed Feb. 10, 2022, which claims priority to Singapore Application No. 10202101420T, filed Feb. 10, 2021, and Singapore Application No. 10202102677U, filed Mar. 16, 2021. The entire disclosures of the aforementioned applications are incorporated herein by reference.

FIELD OF INVENTION

The invention relates to link adaptation in wireless communications, and more particularly to methods and devices for link adaptation feedback in a wireless local area network (WLAN).

BACKGROUND

Institute of Electrical and Electronics Engineers (IEEE) 802.11ax high efficiency (HE) WLAN supports a bandwidth (BW) up to 160 MHz and supports the number of spatial streams in a multi-user multiple input multiple output (MU-MIMO) transmission up to 8. In order to achieve significant throughput improvement over IEEE 802.11ax HE WLAN, IEEE 802.11be extremely high throughput (EHT) WLAN has been proposed to extend the maximum BW support from 160 MHz to 320 MHz and extend the maximum number of spatial streams supported in a MU-MIMO transmission from 8 to 16.

As link adaptation feedback is crucial to system throughput, HE link adaptation (HLA) Control subfield included in high throughput (HT) Control field has been introduced in IEEE 802.11ax HE WLAN to report the link adaptation feedback. However, as the HT Control field is not included in control frames, the link adaptation feedback can only be transmitted when there are data or management frames. Therefore, link adaptation feedback for downlink transmission may be less frequent or with larger overhead using quality of service (QoS) Null frames. Further, the HLA Control subfield cannot support 320 MHz BW and 16 spatial streams due to a limit of the number of bits. As a result, the IEEE 802.11ax link adaptation mechanism may not be efficient for IEEE 802.11be EHT WLAN.

It would therefore be desirable to provide a more effective and efficient link adaption mechanism/solution in a WLAN, especially in IEEE 802.11be EHT WLAN.

SUMMARY OF INVENTION

Embodiments of the invention provide methods and devices for link adaptation feedback in a WLAN. With the methods and devices proposed in various embodiments of the invention, a link adaptation feedback may be transmitted in a WLAN, e.g., IEEE 802.11be EHT WLAN, in a timely manner and without incurring larger overhead.

According to a first aspect of the invention, various embodiments of the invention provide a first method for link adaptation feedback in a WLAN. This method is performed at a transmitting device, e.g., an access point station (AP STA). The method may comprise: transmitting, by the transmitting device, a first physical layer (PHY) protocol data unit (PPDU) to one or more receiving devices, wherein the first PPDU comprises one or more aggregate medium access control (MAC) protocol data units (A-MPDUs), and each A-MPDU corresponds to one of the one or more receiving devices, and receiving, by the transmitting device, a second PPDU from each of the one or more receiving devices, wherein the second PPDU comprises a block acknowledgement (BA) frame carrying a link adaptation feedback, wherein whether the link adaptation feedback is a solicited or an unsolicited link adaptation feedback depends on whether a link adaptation feedback request is included in the corresponding A-MPDU.

In some embodiments, the link adaptation feedback from a receiving device may be estimated based on the first PPDU. Alternatively, the link adaptation feedback from a receiving device may be estimated based on any PPDU which was transmitted by the transmitting device to the receiving device before the first PPDU.

In some embodiments, when the first PPDU is transmitted to only one receiving device, i.e., in a single user (SU) transmission between the transmitting device and the only one receiving device, the first PPDU includes only one A-MPDU, which corresponds to the only one receiving device, and the second PPDU received by the transmitting device from the receiving device includes the BA frame carrying the solicited link adaptation feedback if the link adaptation request is included in the corresponding A-MPDU, or the unsolicited link adaptation feedback if the A-MPDU does not include the link adaptation request.

In some embodiments, when the first PPDU is transmitted to a plurality of receiving devices, i.e. in a multi-user (MU) transmission between a transmitting device and a plurality of receiving devices, the first PPDU comprises a plurality of A-MPDUs, each A-MPDU corresponding to one of the plurality of receiving devices; and the second PPDU from any one of the plurality of receiving devices includes the BA frame carrying the solicited link adaptation feedback if the link adaptation feedback request is included in the corresponding A-MPDU, or the unsolicited link adaptation feedback if the corresponding A-MPDU does not include the link adaptation feedback request and is set to enable the unsolicited link adaptation feedback.

In some embodiments, if the link adaptation feedback request is included in the corresponding A-MPDU in a SU transmission or a MU transmission, the link adaptation feedback request may be included in a link adaptation (LA) Control subfield of an HT Control field in each of one or more data frames in the corresponding A-MPDU.

In some embodiments, the LA Control subfield may further include at least one subfield which is set to indicate a resource unit (RU) or multiple resource unit (MRU) requested by the transmitting device to receive the link adaptation feedback from the corresponding receiving device.

Further, when the first PPDU is transmitted to a plurality of receiving devices, the at least one subfield in the LA Control subfield may be set to indicate that the RU or MRU requested by the transmitting device to receive the link adaptation feedback from the corresponding receiving device may be the same as or within a RU or MRU allocated to the corresponding receiving device for reception of the first PPDU.

In some embodiments, the LA Control subfield may be an EHT type of HLA Control subfield or an EHT link adaptation (ELA) Control subfield. Preferably, the EHT type of HLA Control subfield or the ELA Control subfield may at least include a modulation and coding scheme (MCS) request (MRQ) sequence identifier (MSI) subfield which is set to include a sequence number in a range of 0 to 6 to identify a specific link adaptation feedback request.

In some embodiments, when the first PPDU is transmitted to a plurality of receiving devices in a MU transmission, a trigger frame may be included in each of the plurality of A-MPDUs carried in the first PPDU, wherein each A-MPDU corresponds to one of the plurality of receiving devices, and the trigger frame in each A-MPDU may include a first subfield which is set to indicate whether the unsolicited link adaptation feedback from the corresponding receiving device is enabled.

In some embodiments, the trigger frame may include a Common Info field and a User Info field, wherein the first subfield may be included in the Common Info field or the User Info field.

In some embodiments, the BA frame in the second PPDU from any one of the one or more receiving devices may include a BA Control field and a BA Info field, wherein the BA Control field may include a subfield to indicate a presence of the link adaptation feedback from the corresponding receiving device in the BA Info field.

According to a second aspect of the invention, various embodiments of the invention provide a second method for link adaptation feedback in a WLAN. This method is performed at a receiving device, e.g., a non-AP STA. The method may comprise:

receiving, by a receiving device, a first PPDU from a transmitting device, wherein the first PPDU comprises an A-MPDU corresponding to the receiving device; and transmitting, by the receiving device during a short interframe spacing, a second PPDU to the transmitting device, wherein the second PPDU comprises a BA frame carrying a link adaptation feedback, wherein whether the link adaptation feedback is a solicited or an unsolicited link adaptation feedback depends on whether a link adaptation feedback request is included in the corresponding A-MPDU.

In some embodiments, the second method may further comprise: estimating, by the receiving device, the link adaptation feedback based on the first PPDU.

In some embodiments, when the first PPDU is transmitted only to the receiving device, i.e. is a SU transmission, the second PPDU transmitted by the receiving device to the transmitting device includes the BA frame carrying the solicited link adaptation feedback if the A-MPDU corresponding to the receiving device comprises the link adaptation feedback request; or the unsolicited link adaptation feedback if the A-MPDU corresponding to the receiving device does not include the link adaptation feedback request.

In some embodiments, when the first PPDU is transmitted to a plurality of receiving devices including the receiving device, the second PPDU transmitted from the receiving device to the transmitting device includes the BA frame carrying the solicited link adaptation feedback if the link adaptation feedback request is included in the corresponding A-MPDU, or the unsolicited link adaptation feedback if the corresponding A-MPDU does not include the link adaptation feedback request and is set to enable the unsolicited link adaptation feedback.

In some embodiments, if the A-MPDU corresponding to the receiving device comprises the link adaptation feedback request, the link adaptation feedback request may be included in a LA Control subfield of an HT Control field in each of one or more data frames in the A-MPDU corresponding to the receiving device.

In some embodiments, the LA Control subfield may include a bandwidth (BW) subfield which is set to indicate a BW requested by the transmitting device to receive the link adaptation feedback from the receiving device, wherein the BW may be the same as a BW indicated in a signal field of the first PPDU. Further, the LA Control subfield may include at least one subfield which is set to indicate a RU or MRU requested by the transmitting device to receive the link adaptation feedback from the receiving device.

In some embodiments, when the first PPDU is transmitted to a plurality of receiving devices, the at least one subfield in the LA Control subfield may be set to indicate the RU or MRU requested by the transmitting device to receive the link adaptation feedback from the receiving device may be the same as or within a RU or MRU allocated to the receiving device for reception of the first PPDU.

Preferably, the LA Control subfield may be an EHT type of HLA Control subfield or an ELA Control subfield. The EHT type of HLA Control subfield or the ELA Control subfield may at least include a MSI subfield which is set to include a sequence number in a range of 0 to 6 to identify a specific link adaptation feedback request.

In some embodiments, when the first PPDU is transmitted to a plurality of receiving devices including the receiving device, the A-MPDU corresponding to the receiving device may include a trigger frame, wherein the trigger frame may include a first subfield which is set to indicate whether the unsolicited link adaptation feedback is enabled.

In some embodiments, the trigger frame may include a Common Info field and a User Info field, wherein the first subfield is included in the Common Info field or the User Info field.

In some embodiments, the BA frame in the second PPDU may include a BA Control field and a BA Info field, wherein the BA Control field may include a subfield to indicate a presence of the link adaptation feedback from the receiving device in the BA Info field.

According to a third aspect of the invention, various embodiments of the invention provide a transmitting device for link adaptation feedback in a WLAN. The transmitting device may comprise a memory to store instructions for performing the first method for link adaptation feedback in the WLAN, and a processor communicably coupled with the memory, the processor configured to execute the instructions to perform the first method for link adaptation feedback in a WLAN as described in various embodiments of the invention.

According to a fourth aspect of the invention, various embodiments of the invention provide a receiving device for link adaptation feedback in a WLAN. The receiving device for link adaptation feedback in a WILAN may comprise a memory to store instructions for performing the second method for link adaptation feedback in the WLAN, and a processor communicably coupled with the memory, the processor configured to execute the instructions to perform the second method for link adaptation feedback in a WLAN as described in various embodiments of the invention.

According to a fifth aspect of the invention, various embodiments of the invention provide a transmitting device for link adaptation feedback in a WLAN. The transmitting device comprises a transmission unit configured to transmit a first PPDU to one or more receiving devices, wherein the first PPDU comprises one or more A-MPDUs, and each A-MPDU corresponds to one of the one or more receiving devices, and a reception unit configured to receive a second PPDU from each of the one or more receiving devices, wherein the second PPDU comprises a BA frame carrying a link adaptation feedback, wherein whether the link adaptation feedback is a solicited or an unsolicited link adaptation feedback depends on whether a link adaptation feedback request is included in the corresponding A-MPDU.

According to a sixth aspect of the invention, various embodiments of the invention provide a receiving device for link adaptation feedback in a WLAN, the receiving device comprising: reception unit configured to receive a first PPDU from a transmitting device, wherein the first PPDU comprises an A-MPDU corresponding to the receiving device; and a transmission unit configured to transmit during a short interframe spacing, a second PPDU to the transmitting device, wherein the second PPDU comprises a BA frame carrying a link adaptation feedback, wherein whether the link adaptation feedback is a solicited or an unsolicited link adaptation feedback depends on whether a link adaptation feedback request is included in the corresponding A-MPDU.

According to a seventh aspect of the invention, various embodiments of the invention provide a computer program product. The computer program product comprises instructions to cause a computer to perform the first or the second method for link adaptation feedback in a WLAN according to any embodiment of the invention, when executed thereon.

According to an eighth aspect of the invention, various embodiments of the invention provide a computer program comprising instructions to cause a computer to perform a method for link adaptation feedback in a WLAN according to any embodiment of the invention, when executed thereon.

According to a nineth aspect of the invention, various embodiments of the invention provide a chip configured to perform a method for link adaptation feedback in a WLAN according to any embodiment of the invention.

BRIEF DESCRIPTION OF THE DRAWINGS

The invention will be described in detail with reference to the accompanying drawings, in which:

FIG. 1A is a block diagram showing a format of an EHT MU PPDU in IEEE 802.11be WLAN;

FIG. 1B is a block diagram showing a format of an EHT trigger based (TB) PPDU in IEEE 802.11be WLAN;

FIG. 2A is a flowchart illustrating a first method for link adaptation feedback in a single user (SU) transmission according to a first embodiment of the invention;

FIG. 2B is a schematic diagram illustrating an example of a frame exchange procedure between two STAs in the SU transmission according to the first embodiment;

FIG. 2C is a flowchart illustrating a second method for link adaptation feedback in a SU transmission according to the first embodiment of the invention;

FIG. 3A is a block diagram illustrating a format of an HLA Control subfield format according to an embodiment of the invention;

FIG. 3B is a block diagram illustrating a format of the HE type of HLA Control subfield;

FIG. 3C is a block diagram illustrating a format of the EHT type of HLA Control subfield;

FIG. 3D is a block diagram illustrating an alternative format of the EHT type of HLA Control subfield;

FIG. 4A is a block diagram illustrating a format of ELA Control subfield according to an embodiment of the invention;

FIG. 4B is a block diagram illustrating a format of the Control Information subfield of the ELA Control subfield as illustrated in FIG. 4A;

FIG. 4C is a block diagram illustrating an alternative format of an ELA Control subfield according to another embodiment of the invention;

FIG. 4D is a block diagram illustrating a format of the Control Information subfield of the ELA Control subfield as illustrated in FIG. 4C;

FIG. 6E is a block diagram illustrating a format of the PPDU Parameters subfield in the MFB subfield in FIG. 6C;

FIG. 6F is a block diagram illustrating a format of the Recommended Parameters subfield in the MFB subfield in FIG. 6C;

FIG. 6G is a block diagram illustrating an alternative format of the BA Information field of a Multi-STA BA frame according to an embodiment of the invention;

FIG. 6H is a block diagram illustrating a format of the MFB subfield in the BA Information field in FIG. 6G;

FIG. 6I is a block diagram illustrating a format of the MFB Control subfield in the MFB subfield in FIG. 6H;

FIG. 6J is a block diagram illustrating a format of the Recommended Parameters subfield in the MFB subfield in FIG. 6H;

FIG. 6K is a block diagram illustrating a format of the SU MFB subfield or MU MFB subfield in the MFB subfield in FIG. 6H;

FIG. 7A is a block diagram illustrating a format of a BA Control field of the Compressed BA frame according to one example of the invention;

FIG. 7B is a block diagram illustrating a format of the BA Information field of the Compressed BA frame illustrated in FIG. 7A;

FIG. 8A is a flowchart illustrating a first method for link adaptation feedback in a multi-user (MU) transmission according to a second embodiment of the invention;

FIG. 10A is a block diagram illustrating another alternative format of the BA Information field of a Multi-STA BA frame according to an embodiment of the invention;

FIG. 10B is a block diagram illustrating a format of the AID TID Info subfield in the Per AID TID Info subfield in FIG. 10C;

FIG. 10C is a block diagram illustrating a format of the Per AID TID Info subfield in the BA Information field in FIG. 10A, when the AID11 subfield of the AID TID Info subfield is the first value;

FIG. 10D is a block diagram illustrating an alternative format of the Per AID TID Info subfield in the BA Information field in FIG. 10A. when the AID11 subfield of the AID TID Info subfield is the first value;

FIG. 10E is a block diagram illustrating a format of the MFB Info Control subfield in the Per AID TID Info subfield in FIG. 10D;

FIG. 10F is a block diagram illustrating a format of the MFB Info subfield in the Per AID TID Info subfield in FIG. 10D, which includes an MFB subfield and may include a padding subfield.

DETAILED DESCRIPTION OF EMBODIMENTS OF THE INVENTION

Figure 5:
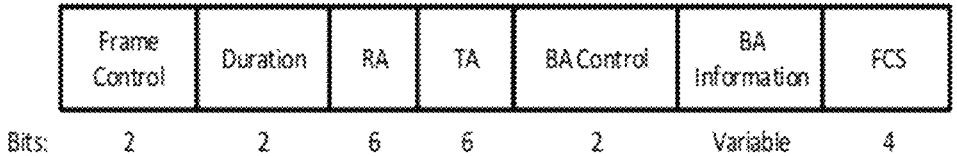
FIG. 5 is a block diagram illustrating a format of a BA frame according to an embodiment of the invention.

In the following description, numerous specific details are set forth in order to provide a thorough understanding of various illustrative embodiments of the invention. It will be understood, however, to one skilled in the art, that embodiments of the invention may be practiced without some or all of these specific details. It is understood that the terminology used herein is for the purpose of describing particular embodiments only, and is not intended to limit the scope of the invention.

Embodiments described in the context of one of the methods or devices are analogously valid for the other methods or devices. Similarly, embodiments described in the context of a method are analogously valid for a device, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

As used herein, the articles "a", "an" and "the" as used with regard to a feature or element include a reference to one or more of the features or elements. As used herein, the term "and/or" includes any and all combinations of one or more of the associated listed items. As used herein, the terms "first," "second," and "third," etc. are used merely as labels, and are not intended to impose numerical requirements on their objects. As used herein, the term "configured to" is interchangeable with "operative" or "adapted to".

As the methods and devices proposed in embodiments of the invention may be used in IEEE 802.11be EHT WLAN, possible formats of an EHT PPDU in IEEE 802.11be WLAN are described below first.

In IEEE 802.11be WLAN, an EHT PPDU may have any one of the following two formats: EHT MU PPDU and EHT TB PPDU. FIG. 1A is a block diagram showing a format of an EHT MU PPDU. FIG. 1B is a block diagram showing a format of an EHT TB PPDU. The EHT MU PPDU as illustrated in FIG. 1A is used for a transmission to one or more users that is not a response to a trigger frame from an AP STA. While the EHT TB PPDU as illustrated in FIG. 1B is used for a transmission that is a response to a trigger frame from an AP STA. Referring to FIGS. 1A and 1B, the EHT signal (EHT-SIG) field is present in the EHT MU PPDU, but not present in the EHT TB PPDU. The duration of the EHT short training field (EHT-STF) in the EHT TB PPDU is twice the duration of the EHT-STF in the EHT MU PPDU.

For an EHT PPDU, each EHT long training field (EHT-LTF) symbol has the same guard intervals (GI) duration as each data symbol, which is 0.8 μs, 1.6 μs or 3.2 μs. The EHT-LTF field comprises three types: 1×EHT-LTF, 2×EHT-LTF and 4×EHT-LTF. The duration of each 1×EHT-LTF, 2×EHT-LTF or 4×EHT-LTF symbol without GI is 3.2 μs, 6.4 μs or 12.8 μs. Each data symbol without GI is 12.8 μs.

In an EHT basic service set (BSS), an EHT MU PPDU may be used for a SU transmission or a downlink MU transmission. On the other hand, an EHT TB PPDU may be used for an uplink MU transmission.

Two embodiments of the invention will be described below to illustrate the details of the methods and devices for link adaptation feedback in a WLAN. It should be noted that these embodiments are provided for illustrative purpose only, not to limit the scope of the invention.

SU Transmission

FIG. 2A is a flowchart illustrating a first method 200A for link adaptation feedback in a single user (SU) transmission according to a first embodiment of the invention. FIG. 2B is a schematic diagram illustrating an example of a frame exchange procedure between two STAs in the SU transmission. In this example, as illustrated in FIG. 2B, STA1 is the transmitting device, which may be an AP STA or a non-AP STA. Accordingly, STA2 is the receiving device, which may be a non-AP STA if the transmitting device is an AP STA, or an AP STA if the transmitting device is a non-AP STA. The first method 200A as illustrated in FIG. 2A is performed by STA1.

At Block 201A, STA1 transmits a first PPDU to STA2, wherein the first PPDU includes an A-MPDU corresponding to STA2, wherein the A-MPDU carries one or more data frames for STA2. The first PPDU may be an EHT MU PPDU.

At Block 202A, STA1 receives a second PPDU from STA2, wherein the second PPDU includes a BA frame carrying a link adaptation feedback, wherein whether the link adaptation feedback is a solicited or an unsolicited link adaptation feedback depends on whether a link adaptation feedback request is included in the A-MPDU corresponding to STA2. The link adaptation feedback request may be a MFB request.

Specifically, the BA frame carries a solicited link adaptation feedback if the link adaptation feedback request is included in the A-MPDU corresponding to STA2, or an unsolicited link adaptation feedback if the A-MPDU corresponding to STA2 does not include the link adaptation feedback request. The BA frame also carries a block acknowledgement on the one or more data frames carried in the A-MPDU.

FIG. 2C is a flowchart illustrating a second method 200B for link adaptation feedback in a SU transmission according to the first embodiment of the invention. The second method 200B as illustrated in FIG. 2C is performed by STA2.

At Block 201B, STA2 receives the first PPDU from STA1, wherein the first PPDU includes the A-MPDU corresponding to STA2, wherein the A-MPDU carries one or more data frames for STA2.

At Block 202B, STA2 transmits the second PPDU to STA1 during a short interframe spacing (SIFS) after receiving the first PPDU, wherein the second PPDU includes a BA frame carrying a link adaptation feedback, wherein whether the link adaptation feedback is a solicited or an unsolicited link adaptation feedback depends on whether a link adaptation feedback request is included in the A-MPDU corresponding to STA2.

Specifically, the BA frame carries a solicited link adaptation feedback if a link adaptation feedback request is included in the A-MPDU corresponding to STA2, or an unsolicited link adaptation if the A-MPDU does not include the link adaptation feedback request. The BA frame also includes a block acknowledgement on the one or more data frames carried in the A-MPDU corresponding to STA2.

In this embodiment, the link adaptation feedback may be estimated by STA2 based on the first PPDU. The type of the link adaptation feedback, i.e. whether the link adaptation feedback is a solicited or an unsolicited link adaptation feedback, depends on whether the A-MPDU in the first PPDU includes a link adaptation feedback request.

In this embodiment, the second PPDU may be an EHT MU PPDU, a non-HT PPDU or a non-HT duplicate PPDU. The link adaption feedback may include transmission parameters, e.g., MCS and RU allocation, etc., recommended by STA2 according to the channel conditions and received signal quality. After receiving the link adaptation feedback, STA1 may adjust and select proper transmission parameters to improve quality and efficiency of data transmission to or from STA2.

In this embodiment, if the A-MPDU carried in the first PPDU includes a MFB request, i.e. the link adaptation feedback request, the BA frame carried in the second PPDU will include a solicited MFB. If the A-MPDU carried in the first PPDU does not include a MFB request, the BA frame carried in the second PPDU will not include a solicited MFB, but may include an unsolicited MFB.

In this embodiment, each of the one or more data frames carried in the A-MPDU of the first PPDU may include a LA Control subfield which includes a MCS feedback (MFB) request in an HT Control field of its MAC header. The LA Control subfields in all of the one or more data frames carried in the A-MPDU are the same. In this embodiment, the LA Control subfield may be an HLA Control subfield or an ELA Control subfield.

In one example, the LA Control subfield may be an HLA Control subfield. FIG. 3A is a block diagram illustrating a format of an HLA Control subfield format according to an embodiment of the invention. As illustrated in FIG. 3A, the HLA Control subfield includes a Control ID subfield and a Control Information subfield. The Control ID subfield may be set to 2 to indicate HLA Control.

The Control Information subfield may include an HE/EHT Indication subfield indicating a type of the HLA Control subfield. For example, the HE/EHT Indication subfield may be set to 1 for an HE type of HLA Control subfield and set to 0 for an EHT type of HLA Control subfield.

FIG. 3B is a block diagram illustrating a format of the HE type of HLA Control subfield and FIG. 3C is a block diagram illustrating a format of the EHT type of HLA Control subfield. As the EHT type of HLA Control subfield is only used for transmission with a MFB request, the unsolicited MFB subfield in the EHT type of HLA Control subfield shall be set to 0 and the MRQ subfield shall be set to 1, as illustrated in FIG. 3C. In the EHT type of HLA Control subfield, the MSI subfield may include a sequence number in the range 0 to 6 that is set to identify a specific MFB request. The BW subfield and the BW Extension subfield may be set to indicate a bandwidth requested by the MFB requester, e.g., STA1 in the first embodiment, to receive feedback, e.g., to receive a link adaptation feedback from STA2 in the first embodiment. The bandwidth indicated by the BW subfield and BW Extension subfield in the EHT type of HLA Control subfield in each of the one or more data frames carried in the first PPDU may be the same as the PPDU bandwidth indicated in a signal field of the first PPDU, e.g., universal signal (U-SIG) field if the first PPDU is an EHT MU PPDU. Alternatively, the BW subfield and the BW Extension subfield in the EHT type of HLA Control subfield may be reserved. In this case, the bandwidth requested by the MFB requester to receive feedback may be equal to the PPDU bandwidth indicated in a signal field of the first PPDU, e.g., U-SIG field if the first PPDU is an EHT MU PPDU. The PS160 subfield and the RU Allocation subfield may be set to indicate a RU or MRU requested by the MFB requester to receive feedback. The PS160 subfield and the RU Allocation subfield are interpreted with the BW subfield and the BW Extension subfield to specify the RU or MRU to be used for receiving the link adaptation feedback.

FIG. 3D is a block diagram illustrating an alternative format of an EHT type of HLA Control subfield according to an embodiment of the invention. In some examples, as the EHT type of HLA Control subfield is only used for transmission with a MFB request, the unsolicited MFB subfield in the EHT type of HLA Control subfield is set to 0 and the MRQ subfield is set to 1, as illustrated in FIG. 3D. In some examples, as the EHT type of HLA Control subfield is only used for transmission with a MFB request, the unsolicited MFB subfield in the EHT type of HLA Control subfield is set to 1 and the MRQ subfield is set to 0. In the EHT type of HLA Control subfield, the MSI subfield may include a sequence number in the range 0 to 6 that is set to identify a specific MFB request. The BW subfield and the BW Extension subfield may be set to indicate a bandwidth requested by the MFB requester, e.g., STA1 in the first embodiment, to receive feedback, e.g., to receive a link adaptation feedback from STA2 in the first embodiment. The bandwidth indicated by the BW subfield and BW Extension subfield in the EHT type of HLA Control subfield in each of the one or more data frames carried in the first PPDU may be the same as the PPDU bandwidth indicated in a signal field of the first PPDU, e.g., universal signal (U-SIG) field if the first PPDU is an EHT MU PPDU. Alternatively, the BW subfield and the BW Extension subfield in the EHT type of HLA Control subfield may be reserved. In this case, the bandwidth requested by the MFB requester to receive feedback may be equal to the PPDU bandwidth indicated in a signal field of the first PPDU, e.g., U-SIG field if the first PPDU is an EHT MU PPDU. The PS160 subfield and the RU Allocation subfield may be set to indicate a RU or MRU requested by the MFB requester to receive feedback. The PS160 subfield and the RU Allocation subfield are interpreted with the BW subfield and the BW Extension subfield to specify the RU or MRU to be used for receiving the link adaptation feedback. The SU MFB Request subfield indicates whether the feedback used for SU-MIMO transmission is requested by the MFB requester. For example, the SU MFB Request subfield is set to 0 to indicate the feedback used for SU-MIMO transmission is not requested by the MFB requester and set to 1 to indicate the feedback used for SU-MIMO transmission is requested by the requester. The MU MFB Request subfield indicates whether the feedback used for MU-MIMO transmission is requested by the MFB requester. For example, the MU MFB Request subfield is set to 0 to indicate the feedback used for MU-MIMO transmission is not requested by the MFB requester and set to 1 to indicate the feedback used for MU-MIMO transmission is requested by the requester.

In another example, the LA Control subfield may be an ELA Control subfield which is also only used for transmission with a MFB request. FIG. 4A is a block diagram illustrating a format of ELA Control subfield according to an embodiment of the invention. As illustrated in FIG. 4A, the ELA Control subfield may include a Control identifier (ID) subfield and a Control Information subfield. In this embodiment, the Control ID subfield is set to a predetermined value, e.g., 8, to indicate ELA Control.

FIG. 4B is a block diagram illustrating a format of the Control Information subfield of the ELA Control subfield as illustrated in FIG. 4A. The MSI subfield may include a sequence number in the range 0 to 6 that is set to identify the specific MFB request. The BW subfield indicates the bandwidth requested by the MFB requester to receive feedback. The bandwidth indicated by the BW subfield in the ELA Control subfield in each of the one or more data frames carried in the first PPDU may be the same as the PPDU bandwidth indicated in a signal field of the first PPDU, e.g., U-SIG field if the first PPDU is an EHT MU PPDU. Alternatively, the BW subfield in the ELA Control subfield may be reserved. In this case, the bandwidth requested by the MFB requester to receive feedback may be equal to the PPDU bandwidth indicated in a signal field of the first PPDU, e.g., U-SIG field if the first PPDU is an EHT MU PPDU. The RU Allocation subfield indicates the RU or MRU requested by the MFB requester to receive feedback. The RU Allocation subfield is interpreted with the BW subfield to specify the RU or MRU. Compared to the HLA Control subfield, the ELA Control subfield requires much less bits.

FIG. 4C is a block diagram illustrating a format of ELA Control subfield according to another embodiment of the invention. As illustrated in FIG. 4C, the ELA Control subfield may include a Control identifier (ID) subfield and a Control Information subfield. In this embodiment, the Control ID subfield is set to a predetermined value, e.g., 8, to indicate ELA Control; and the Control Information subfield has 18 bits.

FIG. 4C is a block diagram illustrating a format of the Control Information subfield of the ELA Control subfield as illustrated in FIG. 4A. The MSI subfield may include a sequence number in the range 0 to 6 that is set to identify the specific MFB request. The BW subfield indicates the bandwidth requested by the MFB requester to receive feedback. The bandwidth indicated by the BW subfield in the ELA Control subfield in each of the one or more data frames carried in the first PPDU may be the same as the PPDU bandwidth indicated in a signal field of the first PPDU, e.g., U-SIG field if the first PPDU is an EHT MU PPDU. Alternatively, the BW subfield in the ELA Control subfield may be reserved. In this case, the bandwidth requested by the MFB requester to receive feedback may be equal to the PPDU bandwidth indicated in a signal field of the first PPDU, e.g., U-SIG field if the first PPDU is an EHT MU PPDU. The RU Allocation subfield indicates the RU or MRU requested by the MFB requester to receive feedback. The RU Allocation subfield is interpreted with the BW subfield to specify the RU or MRU. The SU MFB Request subfield indicates whether the feedback used for SU-MIMO transmission is requested by the MFB requester. For example, the SU MFB Request subfield is set to 0 to indicate the feedback used for SU-MIMO transmission is not requested by the MFB requester and set to 1 to indicate the feedback used for SU-MIMO transmission is requested by the requester. The MU MFB Request subfield indicates whether the feedback used for MU-MIMO transmission is requested by the MFB requester. For example, the MU MFB Request subfield is set to 0 to indicate the feedback used for MU-MIMO transmission is not requested by the MFB requester and set to 1 to indicate the feedback used for MU-MIMO transmission is requested by the requester. In some examples, the SU MFB Request subfield is set to 1 to indicate the feedback used for SU-MIMO transmission is not requested by the MFB requester and set to 0 to indicate the feedback used for SU-MIMO transmission is requested by the requester. The MU MFB Request subfield indicates whether the feedback used for MU-MIMO transmission is requested by the MFB requester. For example, the MU MFB Request subfield is set to 1 to indicate the feedback used for MU-MIMO transmission is not requested by the MFB requester and set to 0 to indicate the feedback used for MU-MIMO transmission is requested by the requester.

FIG. 5 is a block diagram illustrating a format of a BA frame according to an embodiment of the invention. As illustrated in FIG. 5, the BA frame may include a BA Control field and a BA Information field. The BA Control field may include a subfield to indicate presence of a link adaptation feedback in the BA Information field.

Figure 6A:
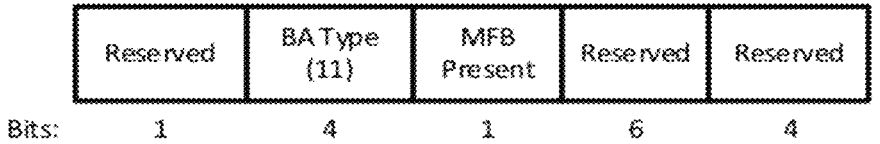
FIG. 6A is a block diagram illustrating a format of a BA Control field of a Multi-STA BA frame according to an embodiment of the invention.

In one example, the BA frame may be a Multi-STA BA frame. FIG. 6A is a block diagram illustrating a format of the BA Control field of the Multi-STA BA frame. In this example, the BA Control field may include a BA Type subfield and a MFB Present subfield. The BA Type subfield may be set to 11 to indicate that the BA frame is a Multi-STA BA frame. The MFB Present subfield may be set to indicate the presence of a MFB subfield in the BA Information field. For example, the MFB Present subfield may be set to 0 to indicate that the MFB subfield is not present in the BA Information field and set to 1 to indicate that the MFB subfield is present in the BA Information field.

Figure 6B:
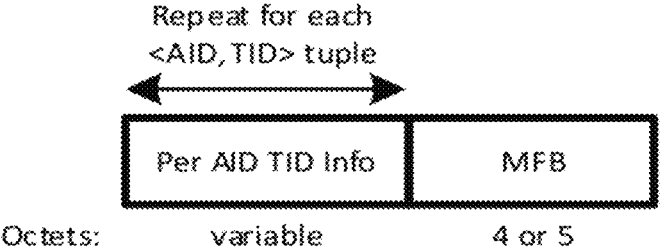
FIG. 6B is a block diagram illustrating a format of the BA Information field of a Multi-STA BA frame according to an embodiment of the invention.

FIG. 6B is a block diagram illustrating a format of the BA Information field of a Multi-STA BA frame. As illustrated in FIG. 6B, the BA Information field may include one or more per association identifier (AID) traffic identifier (TID) Info subfields for block acknowledgement and a MFB subfield for link adaptation feedback.

Figure 6C:
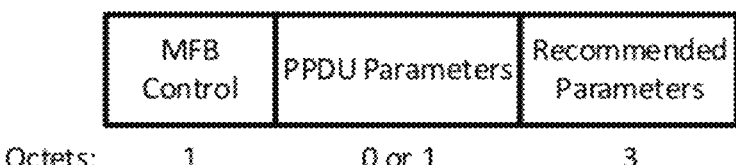
FIG. 6C is a block diagram illustrating a format of the MFB subfield in the BA Information field in FIG. 6B.

FIG. 6C is a block diagram illustrating a format of the MFB subfield in the BA Information field in FIG. 6B. As illustrated in FIG. 6C, the MFB subfield may include a MFB Control subfield, a PPDU Parameters subfield and a Recommended Parameters subfield.

Figure 6D:
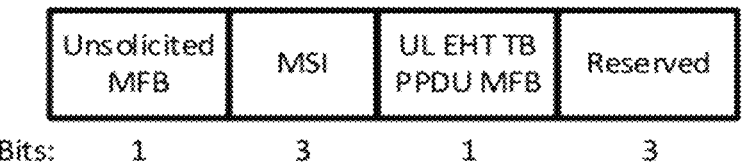
FIG. 6D is a block diagram illustrating a format of the MFB Control subfield in the MFB subfield in FIG. 6C.

FIG. 6D is a block diagram illustrating a format of the MFB Control subfield in the MFB subfield in FIG. 6C. As illustrated in FIG. 6D, the MFB Control subfield may include an Unsolicited MFB subfield, a MSI subfield and an uplink (UL) EHT TB PPDU MFB subfield. The Unsolicited MFB subfield is set to indicate whether the link adaptation feedback is an unsolicited MFB or a solicited MFB. For example, the Unsolicited MFB subfield may be set to 1 to indicate the unsolicited MFB and set to 0 to indicate the solicited MFB. When the Unsolicited MFB subfield is set to 0, the MSI subfield may include a sequence number in the range 0 to 6 that is set to identify a specific solicited MFB request. When the Unsolicited MFB subfield is set to 1, the UL EHT TB PPDU MFB subfield is set to indicate whether the recommended transmission parameters indicated in the Recommended Parameters subfield are applied for transmission of an EHT TB PPDU from STA2. For example, the UL EHT TB PPDU MFB subfield is set to 0 to indicate the recommended transmission parameters indicated in the Recommended Parameters subfield are applied for transmission of an EHT MU PPDU to STA2; and set to 1 to indicate the recommended transmission parameters indicated in the Recommended Parameters subfield are applied for transmission of an EHT TB PPDU from STA2. It should be noted that for the solicited MFB, the recommended transmission parameters indicated in the Recommended Parameters subfield are always applied for transmission of an EHT MU PPDU to STA2.

FIG. 6E is a block diagram illustrating a format of the PPDU Parameters subfield in the MFB subfield in FIG. 6C. The PPDU Parameters subfield may include some information on PPDU from which the unsolicited MFB is estimated. When the Unsolicited MFB subfield is set to 0, the PPDU Parameters subfield is not present. As illustrated in FIG. 6E, the PPDU Parameters subfield may include a PPDU Format subfield, a Coding Type subfield and a Tx Beamforming subfield. The PPDU Format subfield is set to indicate the format of the PPDU from which the unsolicited MFB is estimated. For example, the PPDU Format subfield may be set to 0 for an EHT MU PPDU and set to 1 for an EHT TB PPDU. The Coding Type subfield may include a coding information of the PPDU from which the unsolicited MFB is estimated. For example, the Coding Type subfield may be set to 0 for binary convolutional coding (BCC) and set to 1 for Low Density Parity Check (LDPC) coding. The Tx Beamforming subfield is set to indicate whether the PPDU from which the unsolicited MFB is estimated is beamformed. For example, the transmit (Tx) Beamforming subfield may be set to 0 for non-beamformed PPDU and set to 1 for beamformed PPDU.

FIG. 6F is a block diagram illustrating a format of the Recommended Parameters subfield in the MFB subfield in FIG. 6C. As illustrated in FIG. 6F, the Recommended Parameters subfield may include a RU Allocation subfield, a BW subfield, a Coding Type subfield, an EHT-MCS subfield and a number of spatial streams (NSS) subfield. The RU Allocation subfield is set to indicate a RU or MRU for which the recommended EHT-MCS applies to the PPDU. The BW subfield is set to indicate the bandwidth for which the recommended EHT-MCS applies to the PPDU. The RU Allocation subfield is interpreted with the BW subfield to specify the RU or MRU. When the Unsolicited MFB subfield of the MFB Control subfield is set to 0 to indicate the solicited MFB, the RU Allocation subfield and the BW subfield are reserved. The Coding Type subfield is set to indicate the coding type for which the recommended EHT-MCS applies to the PPDU. The EHT-MCS subfield is set to indicate the recommended EHT-MCS for the PPDU. The NSS subfield is set to indicate the recommended number of spatial streams for the PPDU.

FIG. 6G is a block diagram illustrating an alternative format of the BA Information field of a Multi-STA BA frame. As illustrated in FIG. 6G, the BA Information field may include one or more per association identifier (AID) traffic identifier (TID) Info subfields for block acknowledgement and a MFB subfield for link adaptation feedback. The MFB subfield has 4 bits, 5 bits or 6 bits.

FIG. 6H is a block diagram illustrating a format of the MFB subfield in the BA Information field in FIG. 6G. As illustrated in FIG. 6H, the MFB subfield may include a MFB Control subfield, a PPDU Parameters subfield and a Recommended Parameters subfield which has 3 octets or 4 octets.

FIG. 6I is a block diagram illustrating a format of the MFB Control subfield in the MFB subfield in FIG. 6H. As illustrated in FIG. 6I, the MFB Control subfield may include an Unsolicited MFB subfield, a MSI subfield, an uplink (UL) EHT TB PPDU MFB subfield, a SU MFB Present subfield, a MU MFB Present subfield and a SU/MU MFB Similarity subfield. The Unsolicited MFB subfield is set to indicate whether the link adaptation feedback is an unsolicited MFB or a solicited MFB. For example, the Unsolicited MFB subfield may be set to 1 to indicate the unsolicited MFB and set to 0 to indicate the solicited MFB. When the Unsolicited MFB subfield is set to 0, the MSI subfield may include a sequence number in the range 0 to 6 that is set to identify a specific solicited MFB request. When the Unsolicited MFB subfield is set to 1, the UL EHT TB PPDU MFB subfield is set to indicate whether the recommended transmission parameters indicated in the Recommended Parameters subfield are applied for transmission of an EHT TB PPDU from STA2. For example, the UL EHT TB PPDU MFB subfield is set to 0 to indicate the recommended transmission parameters indicated in the Recommended Parameters subfield are applied for transmission of an EHT MU PPDU to STA2; and set to 1 to indicate the recommended transmission parameters indicated in the Recommended Parameters subfield are applied for transmission of an EHT TB PPDU from STA2. It should be noted that for the solicited MFB, the recommended transmission parameters indicated in the Recommended Parameters subfield are always applied for transmission of an EHT MU PPDU to STA2. The SU MFB Present subfield indicates whether the SU MFB subfield is present in the Recommended Parameters subfield. For example, the SU MFB Present subfield is set to 0 to indicate the SU MFB subfield is not present in the Recommended Parameters subfield and set to 1 to indicate the SU MFB subfield is present in the Recommended Parameters subfield. The MU MFB Present subfield indicates whether the MU MFB subfield is present in the Recommended Parameters subfield. For example, the MU MFB Present subfield is set to 0 to indicate the MU MFB subfield is not present in the Recommended Parameters subfield and set to 1 to indicate the MU MFB subfield is present in the Recommended Parameters subfield. The SU/MU MFB Similarity subfield indicates whether the SU MFB is the same as the MU MFB. For example, the SU/MU MFB Similarity subfield is set to 0 to indicate the SU MFB is different from the MU MFB and set to 1 to indicate the SU MFB is the same as the MU MFB. When the SU MFB Present subfield and the MU MFB subfield are set to indicate both the SU MFB subfield and the MU MFB subfield are present in the Recommended Parameters subfield, the SU/MU MFB Similarity subfield shall be set to indicate the SU MFB is different from the MU MFB. When the SU MFB Present subfield and the MU MFB subfield are set to indicate either SU MFB subfield or the MU MFB subfield is present in the Recommended Parameters subfield, the SU/MU MFB Similarity subfield may be set to indicate the SU MFB is the same as the MU MFB. In this case, MFB indicated in the Recommended Parameters subfield can be used for both SU-MIMO transmission and MU-MIMO transmission.

FIG. 6J is a block diagram illustrating a format of the Recommended Parameters subfield in the MFB subfield in FIG. 6H. As illustrated in FIG. 6J, the Recommended Parameters subfield may include a RU Allocation subfield, a BW subfield, a SU MFB subfield and a MU MFB subfield. The RU Allocation subfield is set to indicate a RU or MRU for which the recommended EHT-MCS applies to the PPDU. The BW subfield is set to indicate the bandwidth for which the recommended EHT-MCS applies to the PPDU. The RU Allocation subfield is interpreted with the BW subfield to specify the RU or MRU. When the Unsolicited MFB subfield of the MFB Control subfield is set to 0 to indicate the solicited MFB, the RU Allocation subfield and the BW subfield are reserved. FIG. 6K is a block diagram illustrating a format of the SU MFB subfield or MU MFB subfield in the Recommended Parameters subfield in FIG. 6J. The SU MFB subfield or MU MFB subfield comprises a Coding Type subfield, an EHT-MCS subfield and a number of spatial streams (NSS) subfield. The Coding Type subfield is set to indicate the coding type for which the recommended EHT-MCS applies to the PPDU. The EHT-MCS subfield is set to indicate the recommended EHT-MCS for the PPDU. The NSS subfield is set to indicate the recommended number of spatial streams for the PPDU.

FIG. 10A is a block diagram illustrating another alternative format of the BA Information field of a Multi-STA BA frame according to an embodiment of the invention. The Multi-STA BA frame may be used to acknowledge a multi-TID A-MPDU. As illustrated in FIG. 10A, the BA Information field may include one or more per association identifier (AID) traffic identifier (TID) Info subfields for block acknowledgement and link adaptation feedback.

FIG. 10B is a block diagram illustrating a format of the AID TID Info subfield in the Per AID TID Info subfield in FIG. 10C. As illustrated in FIG. 10B, the AID TID Info subfield includes an AID11 subfield, an Ack Type subfield and a TID subfield. The AID11 subfield is set to a first value which is in [2008 2047] excluding 2045 to indicate the Per AID TID Info subfield carries link adaptation feedback information.

FIG. 10C is a block diagram illustrating a format of the Per AID TID Info subfield in the BA Information field in FIG. 10A, when the AID11 subfield of the AID TID Info subfield is the first value. As illustrated in FIG. 10C, the Per AID TID Info subfield includes an AID TID Info subfield as illustrated in FIG. 10B and an MFB subfield. The MFB subfield illustrated in FIG. 10C has a same definition as its counterpart illustrated in FIG. 6B or FIG. 6G.

FIG. 10D is a block diagram illustrating an alternative format of the Per AID TID Info subfield in the BA Information field in FIG. 10A. when the AID11 subfield of the AID TID Info subfield is the first value. As illustrated in FIG. 10D, the Per AID TID Info subfield includes an AID TID Info subfield as illustrated in FIG. 10B, an MFB Info Control subfield and an MFB Info subfield. The Ack Type subfield of the AID TID Info subfield shall be set to 0 and the TID subfield of the AID TID Info subfield shall be set to either of 0 to 7.

FIG. 10E is a block diagram illustrating a format of the MFB Info Control subfield in the Per AID TID Info subfield in FIG. 10D. As illustrated in FIG. 10E, the MFB Info Control subfield includes a 4-bit MFB Length subfield and an MFB AID11 subfield. The MFB Length subfield indicates the length of the MFB Info subfield. B3 of the MFB Length subfield shall be set to 0; and B2-B1 of the MFB Length subfield is set to 0 or 3 to indicate the MFB Info subfield with a length of 8 or 4 octets, respectively. The MFB AID11 subfield carries the 11 LSBs of the AID of the STA for which the link adaptation feedback information is intended.

For a Per AID TID Info field as illustrated in FIG. 10D, the Ack Type subfield of the AID TID Info subfield, the TID subfield of the AID TID Info subfield and the MFB Length subfield of the MFB Info Control subfield are set in such a manner that a legacy STA is able to determine the length of the Per AID TID Info field properly.

FIG. 10F is a block diagram illustrating a format of the MFB Info subfield in the Per AID TID Info subfield in FIG. 10D, which includes an MFB subfield and may include a padding subfield. The MFB subfield illustrated in FIG. 10F has a same definition as its counterpart illustrated in FIG. 6B or FIG. 6G. If the length of the MFB subfield is exactly the same as indicated in the MFB Length subfield of the MFB Info Control subfield, the padding subfield is not present in the MFB Info subfield.

In another example, the BA frame may be a compressed BA frame. FIG. 7A is a block diagram illustrating a format of a BA Control field of the compressed BA frame according to one example of the invention. As illustrated in FIG. 7A, the BA Type subfield is set to 2 to indicate that the BA frame is a compressed BA. The MFB Present subfield is set to indicate the presence of the MFB subfield in the BA Information field. For example, the MFB Present subfield may be set to 0 to indicate the MFB subfield is not present in the BA Information field and set to 1 to indicate the MFB subfield is present in the BA Information field. FIG. 7B is a block diagram illustrating a format of the BA Information field of the compressed BA frame illustrated in FIG. 7A. As illustrated in FIG. 7B, the BA Information field may include a Block Ack Starting Sequence Control subfield, a Block Ack Bitmap subfield and a MFB subfield. The format of the MFB subfield is illustrated in FIG. 6C to FIG. 6F or FIG. 6G to FIG. 6K.

MU Transmission

Figure 8B:
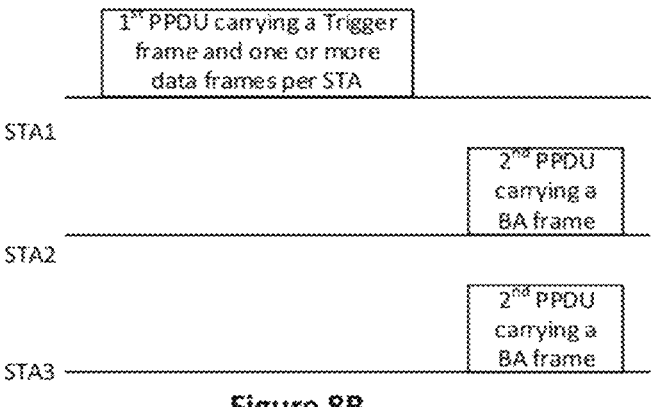
FIG. 8B is a schematic diagram illustrating an example of a frame exchange procedure among three STAs in a MU transmission according to the second embodiment of the invention.

FIG. 8A is a flowchart illustrating a first method 800A for link adaptation feedback in a multi-user (MU) transmission according to a second embodiment of the invention. FIG. 8B is a schematic diagram illustrating an example of a frame exchange procedure among three STAs in a MU transmission according to the second embodiment of the invention. The MU transmission is carried out between a transmitting device, e.g., an AP STA and a plurality of receiving devices, e.g., non-AP STAs. Referring to FIG. 8B, STA1 is the AP STA, and STA2 and STA3 are the non-AP STAs. The first method 800A as illustrated in FIG. 8A is performed by the AP STA, e.g., STA1.

At Block 801A, AP STA, e.g., STA1, transmits a first PPDU to each of a plurality of non-AP STAs, e.g., STA2 and STA3, wherein the first PPDU includes a plurality of A-MP-DUs, and each A-MPDU corresponds to one of the plurality of non-AP STAs.

In this embodiment, the A-MPDU corresponding to each non-AP STA may carry a trigger frame and one or more data frames. The first PPDU may be an EHT MU PPDU.

In this embodiment, a link adaptation feedback request may be included in each of the one or more data frames in the A-MPDU corresponding to each non-AP STA. The link adaptation feedback request may be a MFB request.

At Block 802A, AP STA, e.g., STA1, receives a second PPDU from each of the plurality of non-AP STAs, e.g., STA2 and STA3, wherein the second PPDU from each non-AP STA includes a BA frame carrying a link adaptation feedback, wherein whether the link adaptation feedback is a solicited or an unsolicited link adaptation feedback depends on whether a link adaptation feedback request is included in the corresponding A-MPDU. In this embodiment, the BA frame also includes a block acknowledgement on the one or more data frames in the corresponding A-MPDU.

For example, the BA frame in the second PPDU from STA2 includes a block acknowledgement on the one or more data frames carried in the A-MPDU corresponding to STA2 in the first PPDU and a solicited or unsolicited link adaptation feedback from STA2; while the BA frame in the second PPDU from STA3 includes a block acknowledgement on the one or more data frames carried in the A-MPDU corresponding to STA3 in the first PPDU, and a solicited or unsolicited link adaptation feedback from STA3.

In this embodiment, the link adaptation feedback may be estimated by the non-AP STA based on the received first PPDU. The type of the link adaptation feedback from any non-AP STA, i.e. whether the link adaptation feedback is a solicited or an unsolicited link adaptation feedback, depends on whether the A-MPDU corresponding to this non-AP STA in the first PPDU includes a link adaptation feedback request. Specifically, the link adaptation feedback is a solicited link adaptation feedback if a link adaptation feedback request is carried in the corresponding A-MPDU, or an unsolicited link adaptation feedback if the corresponding A-MPDU does not comprise the link adaptation feedback request and is set to enable the unsolicited link adaptation feedback.

In this embodiment, the second PPDU may be an EHT TB PPDU.

Figure 8C:
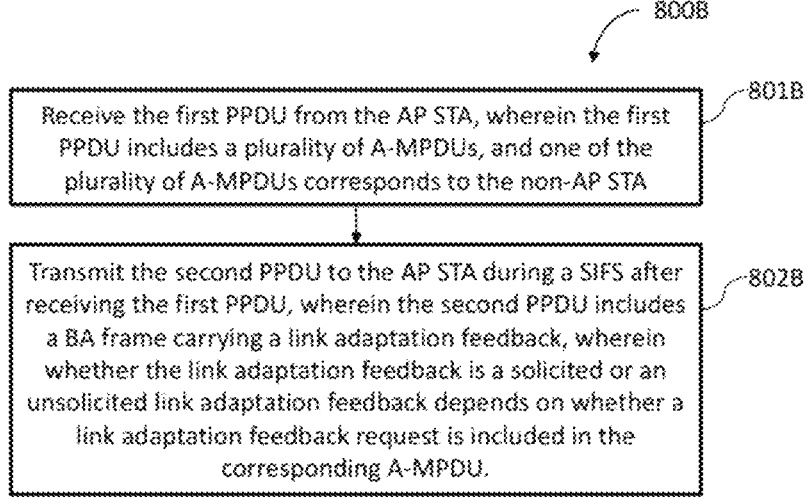
FIG. 8C is a flowchart illustrating a second method for link adaptation feedback in a multi-user (MU) transmission according to the second embodiment of the invention.

FIG. 8C is a flowchart illustrating a second method 800B for link adaptation feedback in a MU transmission according to the second embodiment of the invention. The second method 800B as illustrated in FIG. 8C is performed by each of the plurality of non-AP STAs, e.g., STA2 and STA3 in FIG. 8B, which have received the first PPDU from the AP STA, e.g., STA1 in FIG. 8B.

At Block 801B, a non-AP STA, e.g., STA2 or STA3, receives the first PPDU from the AP STA, e.g., STA1, wherein the first PPDU includes a plurality of A-MPDUs, and one of the plurality of A-MPDUs corresponds to the non-AP STA.

In this embodiment, the A-MPDU corresponding to the non-AP STA may carry a trigger frame and one or more data frames. The A-MPDU may also include a link adaptation feedback request included in each of the one or more data frames or the trigger frame. Alternatively, the A-MPDU may be set to enable an unsolicited link adaptation feedback from the non-AP STA.

At Block 802B, the non-AP STA transmits the second PPDU to the AP STA during a SIFS after receiving the first PPDU, wherein the second PPDU includes a BA frame carrying a link adaptation feedback, wherein whether the link adaptation feedback is a solicited or an unsolicited link adaptation feedback depends on whether a link adaptation feedback request is included in the corresponding A-MPDU.

In this embodiment, the BA frame also includes a block acknowledgement on the one or more data frames in the A-MPDU corresponding to this non-AP STA carried in the first PPDU. The solicited or unsolicited link adaptation feedback may be estimated by the non-AP STA based on the received first PPDU.

In this embodiment, the plurality of non-AP STAs which have received the first PPDU from the AP STA, e.g., the STA2 and STA3, may transmit the second PPDUs simultaneously upon SIFS after receiving the first PPDU from the AP-STA.

In this embodiment, the link adaptation feedback request may be a MBF request. If the A-MPDU corresponding to the non-AP STA carried in the first PPDU includes a MFB request, the BA frame carried in the second PPDU from this non-AP STA will include a solicited MFB. If the A-MPDU for a non-AP STA carried in the first PPDU does not include a MFB request, the BA frame carried in the second PPDU from this non-AP STA will not include a solicited MFB, but may include an unsolicited MFB if the unsolicited MFB from this non-AP STA is enabled or if the unsolicited MFB from this non-AP STA is not disabled.

In this embodiment, if the link adaptation feedback request to a non-AP STA, e.g., a MFB request to STA2 or STA3, is included in the one or more data frames in an A-MPDU corresponding to this non-AP STA carried in the first PPDU, each of the one or more data frames in the A-MPDU corresponding to this non-AP STA may include a LA Control subfield which includes a MFB request to this non-AP STA in the HT Control field of its MAC header. The LA Control subfields in all of the one or more data frames in the A-MPDU corresponding to this non-AP STA carried in the first PPDU are the same. In this embodiment, the LA Control subfield may be an EHT type of HLA Control subfield as illustrated in FIG. 3A and FIG. 3C or an ELA Control subfield as illustrated in FIG. 4A and FIG. 4B.

In this embodiment, if the first PPDU includes a MFB request for a non-AP STA in the one or more data frames included in the A-MPDU corresponding to the non-AP STA, the RU or MRU requested to receive feedback from the non-AP STA, which is indicated in the LA Control subfields of the one or more data frames in the A-MPDU corresponding to the non-AP STA, may be the same as or within the RU or MRU allocated to the non-AP STA for reception of the first PPDU as indicated in a signal field of the first PPDU, e.g., EHT-SIG field if the first PPDU is an EHT MU PPDU.

In this embodiment, the trigger frame in an A-MPDU corresponding to a non-AP STA carried in the first PPDU may be a unicast trigger frame including a Common Info field and a single User Info field. The Common Info field or the User Info field may include a first subfield, e.g., an Unsolicited MFB Disabled subfield, which is set to indicate whether the unsolicited MFB is disabled. For example, the first subfield may be set to 0 to indicate the unsolicited MFB is enabled and set to 1 to indicate unsolicited MFB is disabled.

In this embodiment, the BA frame transmitted by a non-AP STA may include an unsolicited MFB or a solicited MFB. If the A-MPDU corresponding to a non-AP STA carried in the first PPDU includes a MFB request, the Unsolicited MFB Disabled subfield in the trigger frame shall be set to 1 to indicate that the unsolicited MFB is disabled. If the A-MPDU corresponding to the non-AP STA carried in the first PPDU does not include a MFB request, the Unsolicited MFB Disabled subfield in the trigger frame may be set to 0 to indicate that the unsolicited MFB is enabled.

Figures 9A, 9B:
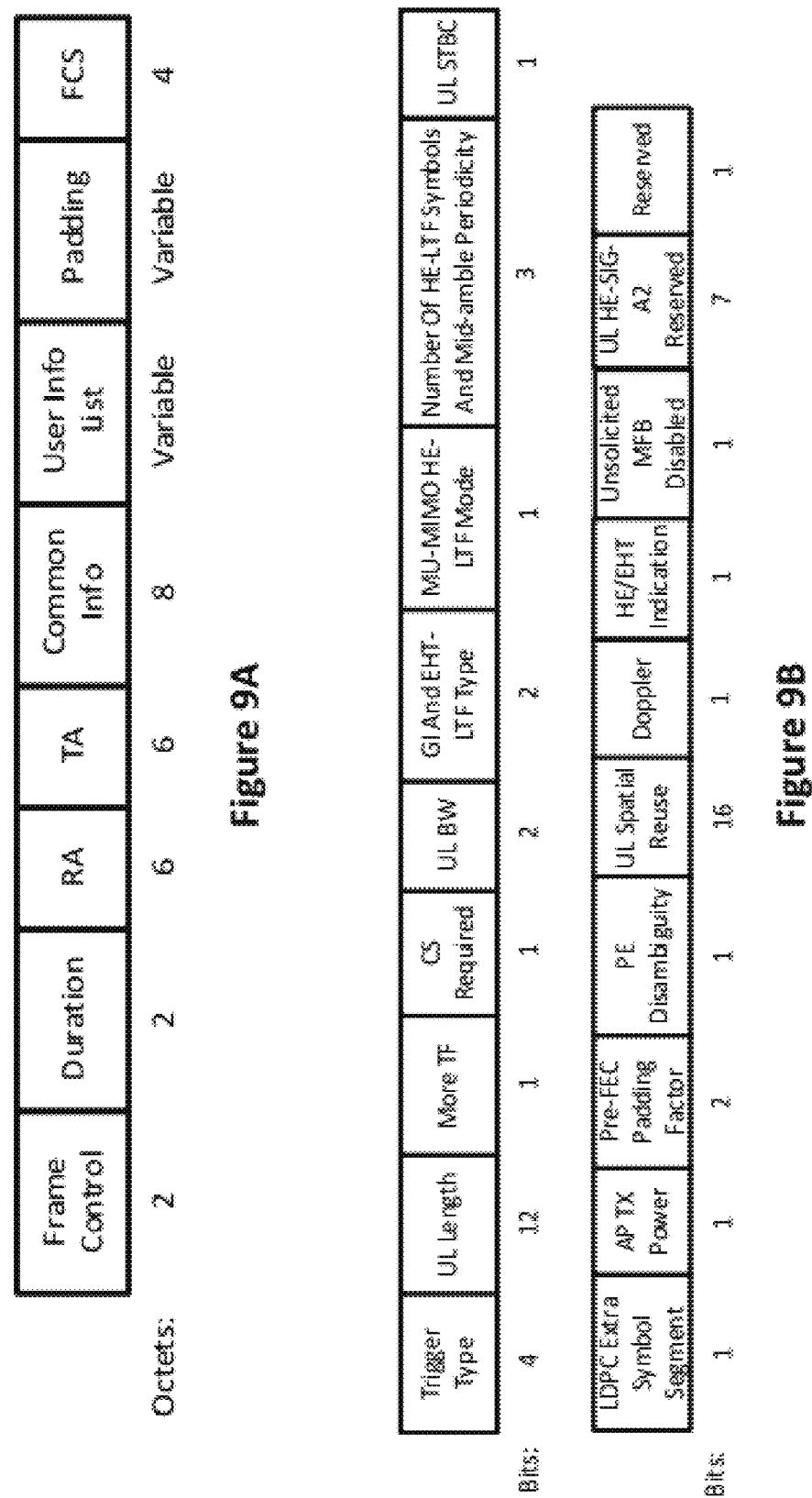
FIG. 9A is a block diagram illustrating a format of a trigger frame according to an embodiment of the invention.
FIG. 9B is a block diagram illustrating a format of a Common Info field of the trigger frame illustrated in FIG. 9A.

FIG. 9A is a block diagram illustrating a format of a trigger frame according to an embodiment of the invention. As illustrated in FIG. 9A, the trigger frame may include a Common Info field and a User Info List field which includes a single User Info field. The formats of the Common Info field and the User Info field depend on the type of the trigger frame.

FIG. 9B is a block diagram illustrating a format of the Common Info field of the trigger frame illustrated in FIG. 9A. Referring to FIG. 9B, the Common Info field may include a UL Length subfield and an Unsolicited MFB Disabled subfield. The UL Length subfield of the Common Info field may be set to indicate a value of the L-SIG length field of the solicited second PPDU, e.g., an EHT TB PPDU. The Unsolicited MFB Disabled subfield may be set to indicate whether an unsolicited MFB is disabled. For example, the Unsolicited MFB Disabled subfield may be set to 0 to indicate that the unsolicited MFB is enabled and set to 1 to indicate that the unsolicited MFB is disabled.

In this embodiment, the UL Length subfield in the Common Info field of each Trigger frame carried in the first PPDU shall be set to a same value in such a manner that the BA frame transmitted by each non-AP STA to the AP STA is able to include both a block acknowledgement on the one or more data frames and a solicited MFB if the corresponding A-MPDU carried in the first PPDU includes a MFB request for the non-AP STA or an unsolicited MFB if the corresponding A-MPDU carried in the first PPDU is set to enable an unsolicited MFB from the non-AP STA.

Figures 9C, 9D:
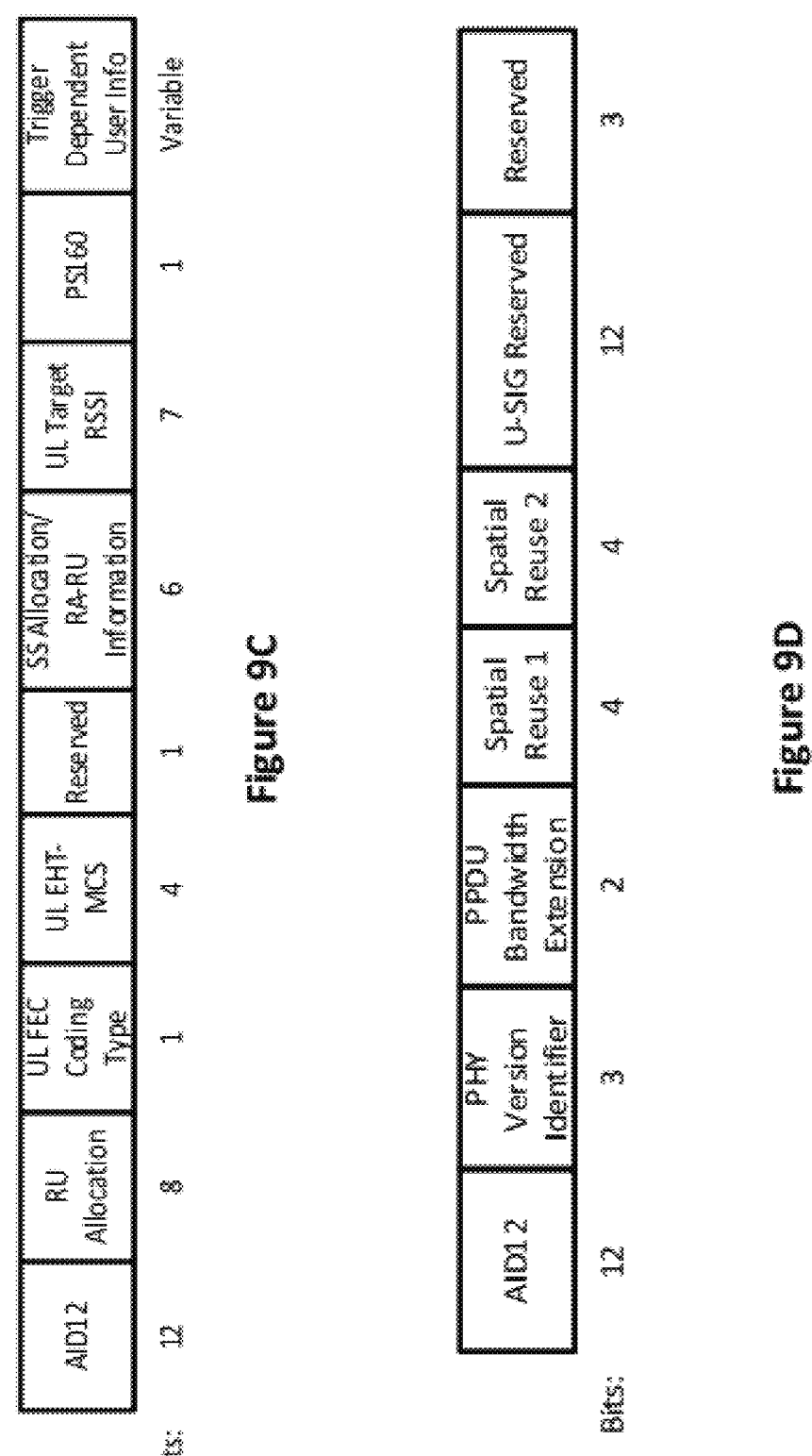
FIG. 9C is a block diagram illustrating a format of an EHT User Info field of the trigger frame illustrated in FIG. 9A.
FIG. 9D is a block diagram illustrating a format of a Special User Info field of the trigger frame illustrated in FIG. 9A.

In this embodiment, the trigger frame may include three types of User Info fields, including HE User Info field, EHT User Info field and Special User Info field. FIG. 9C is a block diagram illustrating a format of the EHT User Info field. As illustrated in FIG. 9C, the EHT User Info field may include a AID12 subfield, a RU Allocation subfield and a PS160 subfield. The RU Allocation subfield and the PS160 subfield may be set to indicate a RU or MRU at which a second PPDU, e.g., EHT TB PPDU, is to be transmitted by a non-AP STA identified by the AID12 subfield.

FIG. 9D is a block diagram illustrating a format of the Special User Info field. The Special User Infor field is set to indicate necessary U-SIG subfields of the solicited second PPDU. Referring to FIG. 9D, the Special User info field may include an AID12 subfield, a PHY Version Identifier subfield, a PPDU Bandwidth Extension subfield, two Special Reuse subfields and a U-SIG Reserved subfield. The AID 12 subfield shall be set to a predetermined value, e.g., 2007. The Special User info field may be located immediately after the Common Info field in the trigger frame. The PPDU Bandwidth Extension subfield, together with the UL BW subfield of the Common Info field, indicates a PPDU bandwidth of the solicited second PPDU.

In this embodiment, the BA frame from a non-AP STA may have a format as illustrated in FIG. 5. The BA frame may include a BA Control field and a BA Information field. In this embodiment, the BA frame may be a Multi-STA BA frame or a Compressed BA frame. An example format of the BA Control field of the Multi-STA BA frame is illustrated in FIG. 6A and an example format of the BA Information field of the Multi-STA BA frame is illustrated in FIG. 6B to FIG. 6F. An example format of the BA Control field of the Compressed BA frame is illustrated in FIG. 7A and an example format of the BA Information field of the Compressed BA frame is illustrated in FIG. 7B.

It should be noted that the formats of various frames, fields or subfields illustrated in FIGS. 3A-7B and 9A-9D according to some embodiments of the invention, are provided for illustrative purpose only, not to limit the scope of the invention. In other embodiments, the various frames, fields or subfields may have different formats as long as the required information or data is indicated in the frames, fields or subfields, e.g., the names or sequence of the subfields in the frames/fields/subfields may be different.

Various embodiments of the invention also provide a transmitting device for link adaptation feedback in a WLAN, e.g., the AP STA or STA1 described in the first methods 200A and 800A above. The transmitting device may include a memory to store instructions for performing the first method for link adaptation feedback in the WLAN, and a processor communicably coupled with the memory, the processor configured to execute the instructions to perform the first method for link adaptation feedback in a WLAN according to any embodiment of the invention.

Various embodiments of the invention also provide a transmitting device for link adaptation feedback in a WLAN. The transmitting device may include a transmission unit configured to transmit a first PPDU to one or more receiving devices, wherein the first PPDU comprises one or more A-MPDUs, and each A-MPDU corresponds to one of the one or more receiving devices, and a reception unit configured to receive a second PPDU from each of the one or more receiving devices, wherein the second PPDU comprises a BA frame carrying a link adaptation feedback, wherein whether the link adaptation feedback is a solicited or an unsolicited link adaptation feedback depends on whether a link adaptation feedback request is included in the corresponding A-MPDU.

In one embodiment, the link adaptation feedback may be estimated based on the first PPDU.

In one embodiment, the transmission unit may be further configured to transmit the first PPDU to only one receiving device, wherein the first PPDU comprises one A-MPDU corresponding to the receiving device; and the reception unit may be further configured to receive the second PPDU from the receiving device, wherein the second PPDU comprises the BA frame carrying the solicited link adaptation feedback if the link adaptation feedback request is included in the corresponding A-MPDU, or an unsolicited link adaptation feedback if the corresponding A-MPDU does not include the link adaptation feedback request.

In one embodiment, the transmission unit may be further configured to transmit the first PPDU to a plurality of receiving devices, wherein the first PPDU comprises a plurality of A-MPDUs, each A-MPDU corresponding to one of the plurality of receiving devices; and the reception unit may be further configured to receive the second PPDU from each of the plurality of receiving devices, wherein the second PPDU from any one of the plurality of receiving devices comprises the BA frame carrying the solicited link adaptation feedback if the link adaptation request is included in the corresponding A-MPDU, or the unsolicited link adaptation feedback if the corresponding A-MPDU does not comprise the link adaptation feedback request and is set to enable the unsolicited link adaptation feedback.

In some embodiments, if the link adaptation feedback request is included in the corresponding A-MPDU, the link adaptation feedback request may be included in a LA Control subfield of an HT Control field in each of one or more data frames in the corresponding A-MPDU.

In some embodiments, the LA Control subfield may include a bandwidth (BW) subfield which is set to indicate a BW requested by the transmitting device to receive the link adaptation feedback from each of the one or more receiving devices, wherein the BW is the same as a BW indicated in a signal field of the first PPDU.

In some embodiments, the LA Control subfield may further include at least one subfield which is set to indicate a RU or MRU requested by the transmitting device to receive the link adaptation feedback from the corresponding receiving device.

In some embodiments, when the first PPDU is transmitted to a plurality of receiving devices, the at least one subfield in the LA Control subfield may be set to indicate that the RU or MRU requested by the transmitting device to receive the link adaptation feedback from the corresponding receiving device is the same as or within a RU or MRU allocated to the corresponding receiving device for reception of the first PPDU.

In some embodiments, the LA Control subfield may be an EHT type of HLA Control subfield or an ELA Control subfield. In one embodiment, the EHT type of HLA Control subfield or the ELA Control subfield may include a MSI subfield which is set to include a sequence number in a range of 0 to 6 to identify a specific link adaptation feedback request.

In some embodiments, when the first PPDU is transmitted to a plurality of receiving devices, the A-MPDU corresponding to any one of the plurality of receiving devices may include a trigger frame, wherein the trigger frame may include a first subfield which is set to indicate whether the unsolicited link adaptation feedback from the corresponding receiving device is enabled.

In some embodiments, the trigger frame may include a Common Info field and a User Info field, wherein the first subfield is included in the Common Info field or the User Info field.

In some embodiments, the BA frame in the second PPDU from any one of the one or more receiving devices may include a BA Control field and a BA Info field, wherein the BA Control field may include a subfield to indicate a presence of the link adaptation feedback from the corresponding receiving device in the BA Info field.

Various embodiments of the invention also provide a receiving device for link adaptation feedback in a WLAN, e.g., the non-AP STA STA2 or STA3 described in the second methods 200B and 800B above. The receiving device for link adaptation feedback in a WILAN may include a memory to store instructions for performing the second method for link adaptation feedback in the WLAN, and a processor communicably coupled with the memory, the processor configured to execute the instructions to perform the second method for link adaptation feedback in a WLAN according to any embodiment of the invention.

Various embodiments also provide a receiving device for link adaptation feedback in a WLAN. The receiving device may include a reception unit configured to receive a first PPDU from a transmitting device, wherein the first PPDU comprises an A-MPDU corresponding to the receiving device; and a transmission unit configured to transmit during a short interframe spacing, a second PPDU to the transmitting device, wherein the second PPDU comprises a BA frame carrying a link adaptation feedback, wherein whether the link adaptation feedback is a solicited or an unsolicited link adaptation feedback depends on whether a link adaptation feedback request is included in the corresponding A-MPDU.

In one embodiment, the receiving device may further include an estimation unit configured to estimate the link adaptation feedback based on the first PPDU.

In one embodiment, when the first PPDU is transmitted only to the receiving device, the transmission unit may be further configured to transmit the second PPDU to the transmitting device, wherein the second PPDU may include the BA frame carrying the solicited link adaptation feedback if the A-MPDU corresponding to the receiving device comprises the link adaptation feedback request; or the unsolicited link adaptation feedback if the A-MPDU corresponding to the receiving device does not include the link adaptation feedback request.

In one embodiment, when the first PPDU is transmitted to a plurality of receiving devices including the receiving device, the transmission unit may be further configured to transmit the second PPDU to the transmitting device, wherein the second PPDU may include the BA frame carrying the solicited link adaptation feedback if the link adaptation feedback request is included in the corresponding A-MPDU, or the unsolicited link adaptation feedback if the corresponding A-MPDU does not include the link adaptation feedback request and is set to enable the unsolicited link adaptation feedback.

In some embodiments, if the A-MPDU corresponding to the receiving device includes the link adaptation feedback request, the link adaptation feedback request may be included in a LA Control subfield of an HT Control field in each of one or more data frames in the A-MPDU corresponding to the receiving device.

In some embodiments, the LA Control subfield may include a bandwidth (BW) subfield which is set to indicate a BW requested by the transmitting device to receive the link adaptation feedback from the receiving device, wherein the BW is the same as a BW indicated in a signal field of the first PPDU.

In some embodiments, the LA Control subfield may further include at least one subfield which is set to indicate a RU or MRU requested by the transmitting device to receive the link adaptation feedback from the receiving device.

In some embodiments, when the first PPDU is transmitted to a plurality of receiving devices, the at least one subfield in the LA Control subfield may be set to indicate the RU or MRU requested by the transmitting device to receive the link adaptation feedback from the receiving device is the same as or within a RU or MRU allocated to the receiving device for reception of the first PPDU.

In some embodiments, the LA Control subfield may be an EHT type of HLA Control subfield or an ELA Control subfield.

In some embodiments, the EHT type of HLA Control subfield or the ELA Control subfield may include a MSI subfield which is set to include a sequence number in a range of 0 to 6 to identify a specific link adaptation feedback request.

In some embodiments, when the first PPDU is transmitted to a plurality of receiving devices, the A-MPDU corresponding to the receiving device may include a trigger frame, wherein the trigger frame comprises a first subfield which is set to indicate whether the unsolicited link adaptation feedback is enabled.

In some embodiments, the trigger frame may include a Common Info field and a User Infor field, wherein the first subfield is included in the Common Info field or the User Info field.

In some embodiments, the BA frame in the second PPDU may include a BA Control field and a BA Info field, wherein the BA Control field may include a subfield to indicate a presence of the link adaptation feedback from the receiving device in the BA Info field.

Embodiments of the invention also provide a computer program product comprising instructions to cause a computer to perform any method for link adaptation feedback in a WLAN according to any embodiment of the invention, when executed thereon.

Embodiments of the invention also provide a computer program comprising instructions to cause a computer to perform a method for link adaptation feedback in a WLAN according to any embodiment of the invention, when executed thereon.

Embodiments of the invention also provide a non-volatile storage medium comprising computer program codes to cause a computer to perform a method for link adaptation feedback in a WLAN according to any embodiment of the invention, when executed thereon.

Embodiments of the invention also provide a chip configured to perform a method for link adaptation feedback in a WLAN according to any embodiment of the invention.

At least some steps of the methods for link adaptation feedback according to any embodiments of the invention described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media.

As described above, with the methods and devices provided in various embodiments of the invention, a link adaptation feedback from a non-AP STA may be sent to the AP STA in a timely manner after receiving a first PPDU, e.g., EHT MU PPDU, from the AP STA. Further, the non-AP STA may send a solicited or an unsolicited the link adaptation feedback to the AP STA after receiving the first PPDU, depending on whether a link adaptation feedback request is included in the first PPDU. Further, compared to the existing mechanism for link adaptation feedback, the proposed methods and devices in embodiments of the invention do not require larger overhead. Therefore, embodiments of the invention provide an effective and efficient solution for link adaptation feedback in a WLAN, e.g., IEEE 802.11be EHT WLAN.

It is to be understood that the embodiments and features described above should be considered exemplary and not restrictive. Many other embodiments will be apparent to those skilled in the art from consideration of the specification and practice of the invention. The scope of the invention should, therefore, be determined with reference to the appended claims, along with the full scope of equivalents to which such claims are entitled. Furthermore, certain terminology has been used for the purposes of descriptive clarity, and not to limit the disclosed embodiments of the invention.

The invention claimed is:

1. A method for link adaptation feedback in a wireless local area network (WLAN), the method comprising:

transmitting, by a transmitting device, a first PPDU to one or more receiving devices, wherein the first PPDU comprises one or more A-MPDUs, and each A-MPDU corresponds to one of the one or more receiving devices, wherein each of one or more data frames corresponding to each of the one or more A-MPDUs comprises an HT Control field and the HT Control field comprises an LA Control subfield, wherein the LA Control subfield comprises an HE/EHT Indication subfield indicating a type of the HLA Control subfield, and the HE/EHT Indication subfield being set to a first value for an HE type of HLA Control subfield and set to a second value for an EHT type of HLA Control subfield or an ELA Control subfield, and wherein the EHT type of HLA Control subfield or the ELA Control subfield comprises a MSI/Partial PPDU Parameters subfield which is set to include a sequence number in a range to identify a specific link adaptation feedback request; and receiving, by the transmitting device, a second PPDU from each of the one or more receiving devices, wherein the MSI/Partial PPDU Parameters subfield occupies 3 bits and in a range of 0 to 6.

2. The method according to claim 1, wherein transmitting the first PPDU comprises: transmitting, by the transmitting device, the first PPDU to only one receiving device, wherein the first PPDU comprises one A-MPDU corresponding to the receiving device; and wherein receiving the second PPDU comprises: receiving, by the transmitting device, the second PPDU from the receiving device, wherein the second PPDU comprises a BA frame carrying a solicited link adaptation feedback if the link adaptation feedback request is included in the corresponding A-MPDU, or an unsolicited link adaptation feedback if the corresponding A-MPDU does not include the link adaptation feedback request.

3. The method according to claim 1, wherein transmitting the first PPDU comprises: transmitting, by the transmitting device, the first PPDU to a plurality of receiving devices, wherein the first PPDU comprises a plurality of A-MPDUs, each A-MPDU corresponding to one of the plurality of receiving devices; and wherein receiving the second PPDU comprises: receiving, by the transmitting device, the second PPDU from each of the plurality of receiving devices, wherein the second PPDU from any one of the plurality of receiving devices comprises a BA frame carrying a solicited link adaptation feedback if the link adaptation feedback request is included in the corresponding A-MPDU, or an unsolicited link adaptation feedback if the corresponding A-MPDU does not comprise the link adaptation feedback request and is set to enable the unsolicited link adaptation feedback.

4. The method according to claim 1, wherein the LA Control subfield comprises a bandwidth (BW) subfield which is set to indicate a BW requested by the transmitting device to receive a link adaptation feedback from each of the one or more receiving devices, wherein the BW is the same as a BW indicated in a signal filed field of the first PPDU.

5. The method according to claim 4, wherein the LA Control subfield further comprises at least one subfield which is set to indicate a RU or MRU requested by the transmitting device to receive the link adaptation feedback from the corresponding receiving device.

6. The method according to claim 5, wherein when the first PPDU is transmitted to a plurality of receiving devices, the at least one subfield in the LA Control subfield is set to indicate that the RU or MRU requested by the transmitting device to receive the link adaptation feedback from the corresponding receiving device is the same as or within a RU or MRU allocated to the corresponding receiving device for reception of the first PPDU.

7. A transmitting device for link adaptation feedback in a WLAN, the transmitting device comprising:

a transmission unit configured to transmit a first PPDU to one or more receiving devices, wherein the first PPDU comprises one or more A-MPDUs, and each A-MPDU corresponds to one of the one or more receiving devices, wherein each of one or more data frames corresponding to each of the one or more A-MPDUs comprises an HT Control field and the HT Control field comprises an LA Control subfield, wherein the LA Control subfield comprises an HE/EHT Indication subfield indicating a type of the HLA Control subfield, and the HE/EHT Indication subfield being set to a first value for an HE type of HLA Control subfield and set to a second value for an EHT type of HLA Control subfield or an ELA Control subfield, and wherein the EHT type of HLA Control subfield or the ELA Control subfield comprises a MSI/Partial PPDU Parameters subfield which is set to include a sequence number in a range to identify a specific link adaptation feedback request; and

a reception unit configured to receive a second PPDU from each of the one or more receiving devices, wherein the MSI/Partial PPDU Parameters subfield occupies 3 bits and in a range of 0 to 6.

8. The transmitting device according to claim 7, wherein the transmission unit is further configured to transmit the first PPDU to only one receiving device, wherein the first PPDU comprises one A-MPDU corresponding to the receiving device; and wherein the reception unit is further configured to receive the second PPDU from the receiving device, wherein the second PPDU comprises a BA frame carrying a solicited link adaptation feedback if the link adaptation feedback request is included in the corresponding A-MPDU, or an unsolicited link adaptation feedback if the corresponding A-MPDU does not include the link adaptation feedback request.

9. The transmitting device according to claim 7, wherein the transmission unit is further configured to transmit the first PPDU to a plurality of receiving devices, wherein the first PPDU comprises a plurality of A-MPDUs, each A-MPDU corresponding to one of the plurality of receiving devices; and wherein the reception unit is further configured to receive the second PPDU from each of the plurality of receiving devices, wherein the second PPDU from any one of the plurality of receiving devices comprises a BA frame carrying a solicited link adaptation feedback if the link adaptation feedback request is included in the corresponding A-MPDU, or a unsolicited link adaptation feedback if the corresponding A-MPDU does not comprise the link adaptation feedback request and is set to enable the unsolicited link adaptation feedback.

10. The transmitting device according to claim 7, wherein the LA Control subfield comprises a bandwidth (BW) subfield which is set to indicate a BW requested by the transmitting device to receive a link adaptation feedback from each of the one or more receiving devices, wherein the BW is the same as a BW indicated in a signal filed field of the first PPDU.

11. The transmitting device according to claim 10, wherein the LA Control subfield further comprises at least one subfield which is set to indicate a RU or MRU requested by the transmitting device to receive the link adaptation feedback from the corresponding receiving device.

12. The transmitting device according to claim 11, wherein when the first PPDU is transmitted to a plurality of receiving devices, the at least one subfield in the LA Control subfield is set to indicate that the RU or MRU requested by the transmitting device to receive the link adaptation feedback from the corresponding receiving device is the same as or within a RU or MRU allocated to the corresponding receiving device for reception of the first PPDU.

13. A receiving device for link adaptation feedback in a WLAN, the receiving device comprising:

a processor; and a memory, configured to store processor-executable instructions, wherein the processor-executable instructions are configured, when run by the processor, to cause the processor to perform a method for link adaptation feedback in a wireless local area network (WLAN), the method comprising:

receiving a first PPDU from a transmitting device, wherein the first PPDU comprises an A-MPDU corresponding to the receiving device, wherein a data frame corresponding to the A-MPDU comprises an HT Control field and the HT Control field comprises an LA Control subfield, wherein the LA Control subfield comprises an HE/EHT Indication subfield indicating a type of the HLA Control subfield, and the HE/EHT Indication subfield being set to a first value for an HE type of HLA Control subfield and set to a second value for an EHT type of HLA Control subfield or an ELA Control subfield, wherein the EHT type of HLA Control subfield or the ELA Control subfield comprises a MSI/Partial PPDU Parameters subfield which is set to include a sequence number in a range to identify a specific link adaptation feedback request; and transmitting, during a short interframe spacing, a second PPDU to the transmitting device, wherein the MSI/Partial PPDU Parameters subfield occupies 3 bits and in a range of 0 to 6.

* * * * *